(12) United States Patent
Guo et al.

(10) Patent No.: US 10,013,975 B2
(45) Date of Patent: Jul. 3, 2018

(54) SYSTEMS AND METHODS FOR SPEAKER DICTIONARY BASED SPEECH MODELING

(71) Applicant: QUALCOMM Incorporated, San Diego, CA (US)

(72) Inventors: Yinyi Guo, San Diego, CA (US); Juhan Nam, San Diego, CA (US); Erik Visser, San Diego, CA (US); Shuhua Zhang, San Diego, CA (US); Lae-Hoon Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/629,109

(22) Filed: Feb. 23, 2015

(65) Prior Publication Data

US 2015/0243284 A1   Aug. 27, 2015

Related U.S. Application Data

(60) Provisional application No. 61/945,691, filed on Feb. 27, 2014.

(51) Int. Cl.
*G10L 21/02* (2013.01)
*G10L 15/20* (2006.01)
(Continued)

(52) U.S. Cl.
CPC .............. *G10L 15/20* (2013.01); *G10L 15/06* (2013.01); *G10L 21/0208* (2013.01); *G10L 21/028* (2013.01)

(58) Field of Classification Search
CPC . G10L 21/02; G10L 21/0208; G10L 21/0232; G10L 21/0272; G10L 21/028
(Continued)

(56) References Cited

U.S. PATENT DOCUMENTS 7,873,064 B1 * 1/2011 Li ..................... G10L 19/005
                                                370/419
9,553,681 B2 * 1/2017 Hoffman ............... H04B 15/00
(Continued)

FOREIGN PATENT DOCUMENTS

CN        102915742 A    2/2013
EP          2061028 A2    5/2009
JP          3571821 B2    9/2004

OTHER PUBLICATIONS

Grais, et al. "Discriminative nonnegative dictionary learning using cross-coherence penalties for single channel source separation." Interspeech. Aug. 2013, pp. 808-812.*
(Continued)

*Primary Examiner* — James Wozniak
(74) *Attorney, Agent, or Firm* — Austin Rapp & Hardman, P.C.

(57) ABSTRACT

A method for speech modeling by an electronic device is described. The method includes obtaining a real-time noise reference based on a noisy speech signal. The method also includes obtaining a real-time noise dictionary based on the real-time noise reference. The method further includes obtaining a first speech dictionary and a second speech dictionary. The method additionally includes reducing residual noise based on the real-time noise dictionary and the first speech dictionary to produce a residual noise-suppressed speech signal at a first modeling stage. The method also includes generating a reconstructed speech signal based on the residual noise-suppressed speech signal and the second speech dictionary at a second modeling stage.

28 Claims, 23 Drawing Sheets

(51) Int. Cl.
    *G10L 15/06* (2013.01)
    *G10L 21/0208* (2013.01)
    *G10L 21/028* (2013.01)

(58) Field of Classification Search
    USPC .................................. 704/226, 233, E21.002
    See application file for complete search history.

(56) References Cited

U.S. PATENT DOCUMENTS

| | | | | |
|---|---|---|---|---|
| 2002/0165711 | A1* | 11/2002 | Boland | G10L 25/78 704/231 |
| 2005/0182624 | A1* | 8/2005 | Wu | G10L 21/0208 704/233 |
| 2007/0055508 | A1 | 3/2007 | Zhao et al. | |
| 2007/0067163 | A1* | 3/2007 | Kabal | G10L 21/038 704/207 |
| 2007/0071116 | A1* | 3/2007 | Oshikiri | G10L 21/038 375/260 |
| 2009/0119097 | A1* | 5/2009 | Master | G10H 1/0008 704/207 |
| 2012/0185246 | A1* | 7/2012 | Zhang | G10L 21/0208 704/226 |
| 2013/0035933 | A1* | 2/2013 | Hirohata | G10L 15/20 704/206 |
| 2013/0121506 | A1* | 5/2013 | Mysore | G10L 21/028 381/94.2 |
| 2013/0124200 | A1* | 5/2013 | Mysore | G10L 15/20 704/211 |
| 2013/0132077 | A1* | 5/2013 | Mysore | G10L 21/028 704/233 |
| 2013/0132085 | A1 | 5/2013 | Mysore et al. | |
| 2014/0249809 | A1* | 9/2014 | Srinivasan | G10L 19/012 704/226 |
| 2014/0249810 | A1* | 9/2014 | Kechichian | G10L 21/0216 704/228 |
| 2015/0046156 | A1* | 2/2015 | Coifman | G10L 21/0208 704/226 |
| 2015/0112670 | A1* | 4/2015 | Le Roux | G10L 21/0208 704/226 |
| 2015/0301796 | A1* | 10/2015 | Visser | G06F 3/167 715/728 |

OTHER PUBLICATIONS

Joder, et al. "Exploring nonnegative matrix factorization for audio classification: Application to speaker recognition." Speech Communication; 10. ITG Symposium; Proceedings of. VDE, Sep. 2012, pp. 1-4.*

Lyubimov, et al. "Non-negative Matrix Factorization with Linear Constraints for Single-Channel Speech Enhancement." arXiv preprint arXiv:1309.6047, Sep. 2013, pp. 1-5.*

Takashima, et al. "Exemplar-based voice conversion in noisy environment." Spoken Language Technology Workshop (SLT), 2012 IEEE. IEEE, Dec. 2012, pp. 313-317.*

Tseng, Hung-Wei, et al. "A single channel speech enhancement approach by combining statistical criterion and multi-frame sparse dictionary learning."INTERSPEECH. 2013, Aug. 2013, pp. 1-5.*

Vincent, et al. "Harmonic and inharmonic nonnegative matrix factorization for polyphonic pitch transcription."Acoustics, Speech and Signal Processing, 2008. ICASSP 2008. IEEE International Conference on. IEEE, Apr. 2008, pp. 109-112.*

Weninger, Felix, et al. "The Munich 2011 CHiME Challenge Contribution: BLSTM-NMF Speech Enhancement and Recognition for Reverberated Multisource Environments." , Sep. 2011, pp. 1-33.*

Wöllmer, Martin, et al. "Noise robust ASR in reverberated multisource environments applying convolutive NMF and Long Short-Term Memory."Computer Speech & Language 27.3, May 2013, pp. 780-797.*

Kim, et al. "Monaural music source separation: Nonnegativity, sparseness, and shift-invariance." International Conference on Independent Component Analysis and Signal Separation. Springer Berlin Heidelberg, 2006, pp. 1-8.*

Li, Teng, Huan Chang, and Jun Wu. "Nonnegative Signal Decomposition with Supervision." Mathematical Problems in Engineering 2013, Aug. 2013, pp. 1-8.*

Gemmeke, et al. "Noise Robust Exemplar-Based Connected Digit Recognition.", Mar. 2010, pp. 1-4.*

Janer, Jordi, et al. "Separation of unvoiced fricatives in singing voice mixtures with semi-supervised NMF." Proc. 16th Int. Conf. Digital Audio Effects. Sep. 2013, pp. 1-4.*

Mohammadiha, Nasser, et al. "Supervised and unsupervised speech enhancement using nonnegative matrix factorization." IEEE Transactions on Audio, Speech, and Language Processing 21.10, Jun. 2013, pp. 2140-2151.*

Co-pending U.S. Appl. No. 61/913,151, filed Dec. 6, 2013.

Gemmeke JF., et al., "Exemplar-Based Sparse Representations for Noise Robust Automatic Speech Recognition", IEEE Transactions on Audio, Speech and Language Processing, IEEE Service Center, New York, NY, USA, vol. 19, No. 7, Sep. 1, 2011 (Sep. 1, 2011), pp. 2067-2080, XP011329904, ISSN: 1558-7916, DOI: 10.1109/TASL.2011.2112350.

International Search Report and Written Opinion—PCT/US2015/017336—ISA/EPO—dated May 8, 2015.

Raj B., et al., "Phoneme-dependent NMF for speech enhancement in monaural mixtures", Proceedings of Interspeech 2011, Aug. 28, 2011 (Aug. 28, 2011), pp. 1217-1220, XP055183140.

Zhu B., et al., "Multi-Stage Non-Negative Matrix Factorization for Monaural Singing Voice Separation", IEEE Transactions on Audio, Speech and Language Processing, IEEE Service Center, New York, NY, USA, vol. 21, No. 10, Oct. 1, 2013 (Oct. 1, 2013), pp. 2096-2107, XP011521580, ISSN: 1558-7916, DOI: 10.1109/TASL.2013.2266773.

* cited by examiner

SYSTEMS AND METHODS FOR SPEAKER DICTIONARY BASED SPEECH MODELING

RELATED APPLICATIONS

This application is related to and claims priority to U.S. Provisional Patent Application Ser. No. 61/945,691, filed Feb. 27, 2014, for "SYSTEMS AND METHODS FOR SPEAKER DICTIONARY BASED SPEECH MODELING."

TECHNICAL FIELD

The present disclosure relates generally to electronic devices. More specifically, the present disclosure relates to systems and methods for speaker dictionary based speech modeling.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society.

As the use of electronic devices has expanded, so has the demand for new and improved features of electronic devices. More specifically, electronic devices that perform new functions and/or that provide higher quality outputs are often sought after.

Some electronic devices utilize audio signals. For example, a smartphone may capture and process a speech signal. However, the audio signal may include significant noise in some instances, which may degrade the quality of the speech signal. As can be observed from this discussion, systems and methods that improve audio signals may be beneficial.

SUMMARY

A method for speech modeling by an electronic device is described. The method includes obtaining a real-time noise reference based on a noisy speech signal. The method also includes obtaining a real-time noise dictionary based on the real-time noise reference. The method further includes obtaining a first speech dictionary and a second speech dictionary. The method additionally includes reducing residual noise based on the real-time noise dictionary and the first speech dictionary to produce a residual noise-suppressed speech signal at a first modeling stage. The method also includes generating a reconstructed speech signal based on the residual noise-suppressed speech signal and the second speech dictionary at a second modeling stage. The method may include selecting an output speech signal from the reconstructed speech signal and the residual noise-suppressed speech signal based on a reconstruction error.

The first modeling stage may be based on non-negative matrix factorization (NMF). The second modeling stage may be based on non-negative matrix factorization (NMF).

Reducing residual noise may include fixing a speech and noise dictionary that comprises the first speech dictionary and the real-time noise dictionary. Reducing residual noise may also include initializing activation coefficients and updating the activation coefficients until convergence.

Reducing the residual noise may include creating a filter based on the first speech dictionary, the real-time noise dictionary, an adapted speech activation coefficient and an adapted noise activation coefficient. Reducing the residual noise may also include estimating the residual noise-suppressed speech signal based on the filter and a pre-enhanced input.

Generating the reconstructed speech signal may include fixing a sub-band pitch-specific dictionary and updating activation coefficients until convergence. Generating the reconstructed speech signal may also include generating the reconstructed speech signal based on a pitch-specific dictionary and the activation coefficients.

The method may include determining the pitch-specific dictionary from a speaker-specific dictionary based on a pitch. The method may also include determining the sub-band pitch-specific dictionary from the pitch-specific dictionary based on bin-wise signal-to-noise ratios (SNRs).

The first speech dictionary and the second speech dictionary may be based on a speaker-specific speech dictionary. Obtaining the first speech dictionary may include initializing a plurality of activation coefficients and speech basis functions. Obtaining the first speech dictionary may also include updating parameters until convergence.

Obtaining the second speech dictionary may include estimating a harmonicity and a pitch for a plurality of speaker-specific speech magnitude spectra. Obtaining the second speech dictionary may also include selecting, from the speaker-specific speech magnitude spectra, speech spectra with corresponding harmonicities above a harmonicity threshold. Obtaining the second speech dictionary may further include labeling each of the selected speech spectra with a corresponding pitch.

An electronic device for speech modeling is also described. The electronic device includes a processor and memory in electronic communication with the processor. The electronic device also includes instructions stored in the memory. The instructions are executable to obtain a real-time noise reference based on a noisy speech signal. The instructions are also executable to obtain a real-time noise dictionary based on the real-time noise reference. The instructions are further executable to obtain a first speech dictionary and a second speech dictionary. The instructions are additionally executable to reduce residual noise based on the real-time noise dictionary and the first speech dictionary to produce a residual noise-suppressed speech signal at a first modeling stage. The instructions are also executable to generate a reconstructed speech signal based on the residual noise-suppressed speech signal and the second speech dictionary at a second modeling stage.

A computer-program product for speech modeling is also described. The computer-program product includes a non-transitory tangible computer-readable medium with instructions. The instructions include code for causing an electronic device to obtain a real-time noise reference based on a noisy speech signal. The instructions also include code for causing the electronic device to obtain a real-time noise dictionary based on the real-time noise reference. The instructions further include code for causing the electronic device to obtain a first speech dictionary and a second speech dictionary. The instructions additionally include code for causing the electronic device to reduce residual noise based on the real-time noise dictionary and the first speech dictionary to produce a residual noise-suppressed speech signal at a first modeling stage. The instructions also include code for causing the electronic device to generate a reconstructed speech signal based on the residual noise-suppressed speech signal and the second speech dictionary at a second modeling stage.

An apparatus for speech modeling is also described. The apparatus includes means for obtaining a real-time noise reference based on a noisy speech signal. The apparatus also includes means for obtaining a real-time noise dictionary based on the real-time noise reference. The apparatus further includes means for obtaining a first speech dictionary and a second speech dictionary. The apparatus additionally includes means for reducing residual noise based on the real-time noise dictionary and the first speech dictionary to produce a residual noise-suppressed speech signal at a first modeling stage. The apparatus also includes means for generating a reconstructed speech signal based on the residual noise-suppressed speech signal and the second speech dictionary at a second modeling stage.

DETAILED DESCRIPTION

Figure 1:
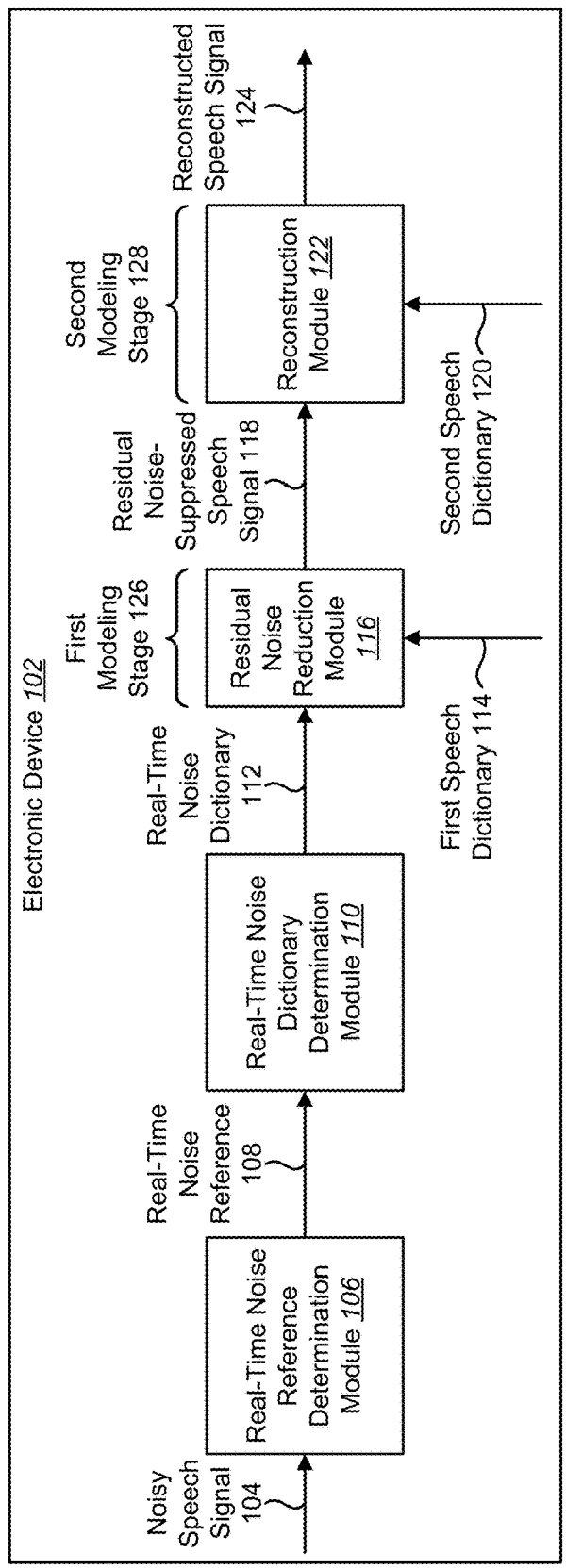
FIG. 1 is a block diagram illustrating one configuration of an electronic device in which systems and methods for speaker dictionary based speech modeling may be implemented.

The systems and methods disclosed herein relate to speaker dictionary based speech modeling. Noise suppression is an integral component of most communication devices today. Many first and second generation systems allow effectively reducing noise power in various degrees. However, the resulting speech output may suffer in the process due to aggressive tuning. Furthermore, residual noise may still be present due to a mismatch in noise modeling. More specifically, some issues of speech enhancement systems are given as follows. A noise-suppressed speech output may include perceptually significant residual noise due to under-estimation of a noise reference from spatial filtering. Additionally, the speech output may suffer from a corrupted speech envelope in sub-bands due to low subband signal-to-noise ratio (SNR). Accordingly, there is a need to predict clean speech of any speaker regardless of input spatial information, noise conditions and/or microphone placement.

Some configurations of the systems and methods described herein may attempt to produce output speech that approximates (e.g., is as close as possible) to clean speech. For example, some configurations of the systems and methods disclosed herein utilize explicit speech models encoded in speech dictionaries that have been learned for a given speaker as well as noise models to model the content output from a typical noise suppression system. Activation coefficients for these models may be learned in a first modeling (e.g., non-negative matrix factorization (NMF)) stage to separate any residual noise from the output (of a noise suppressor, for example).

In a second modeling stage, activation coefficients for a refined speech model may be learned to restore the speech envelope damaged by the noise suppression (NS) system. The final output may contain mostly speech elements and may have a voice color close to clean speech.

Some configurations of the systems and methods disclosed herein may include one or more of the following. Noise and/or speech data may be modeled using a dictionary-based approach. A speaker-specific speech dictionary may be learned. A two-stage dictionary-based speech/noise modeling utilizing Non-negative Matrix Factorization (NMF) may be employed. For example, a first modeling stage may include NMF-based Wiener filtering to remove residual noise. A second modeling stage may include NMF-based envelope restoration to maintain a clean speech envelope.

Advantages of the systems and methods disclosed herein may include one or more of the following. Highly non-stationary noise may be efficiently filtered out. Noise and speech harmonic structure may be precisely differentiated. A speaker's clean voiced speech envelope may be maintained. Speaker-specific speech characteristics may be preserved.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of an electronic device 102 in which systems and methods for speaker dictionary based speech modeling may be implemented. Examples of the electronic device 102 include smartphones, cellular phones, voice recorders, digital cameras, tablet devices, laptop computers, desktop computers, video cameras, landline phones, etc.

The electronic device 102 may include one or more of a real-time noise reference determination module 106, a real-time noise dictionary determination module 110, a residual noise reduction module 116, and a reconstruction module 122. As used herein, a "module" may be implemented in hardware (e.g., circuitry) or a combination of hardware and software. It should be noted that one or more of the modules described in connection with FIG. 1 may be optional. Furthermore, one or more of the modules may be combined or divided in some configurations. More specific examples of one or more of the functions, procedures, parameters, values and/or structures described in connection with FIG. 1 may be given in connection with one or more of FIGS. 2-5, 10, 12-13, 15 and 17-21.

The electronic device 102 may obtain a noisy speech signal 104. For example, the electronic device 102 may capture a noisy speech signal 104 using one or more microphones. Additionally or alternatively, the electronic device 102 may receive the noisy speech signal 104 from another device (e.g., a wireless headset, another device, etc.). The noisy speech signal 104 may include speech and noise. Noise may be any sound that interferes with desired speech sounds and/or any sound other than desired speech sounds. Examples of noise include background noise, competing talkers, wind noise, music noise, babble noise, stationary noise and/or non-stationary noise, etc. In some cases, the noisy speech signal 104 may include one or more voiced portions, unvoiced portions, silent portions, noise-only portions and/or speech-only portions, for example. In some configurations, the noisy speech signal 104 may be divided into frames (and optionally sub-frames), where a frame is a portion of the noisy speech signal 104 in time. The noisy speech signal 104 (or a signal based on the noisy speech signal 104) may be provided to the real-time noise reference determination module 106.

The real-time noise reference determination module 106 may obtain a real-time noise reference 108 based on the noisy speech signal 104. For example, the real-time noise reference determination module 106 may generate a signal that represents noise in the noisy speech signal 104. In some configurations, the real-time noise reference determination module 106 may be a noise suppressor, may be included within a noise suppressor and/or may be utilized in conjunction with a noise suppressor. A more specific example of an approach for obtaining the real-time noise reference 108 is given in connection with FIG. 18. The real-time noise reference 108 may be provided to the real-time noise dictionary determination module 110.

The real-time noise dictionary determination module 110 may obtain a real-time noise dictionary 112 based on the real-time noise reference 108. For example, the real-time noise dictionary determination module 110 may determine one or more basis functions that represent one or more characteristics (e.g., frequency, magnitude, phase, etc.) of the real-time noise reference 108. The real-time noise dictionary 112 may include these basis functions. A more specific example of an approach for obtaining the real-time noise dictionary 112 is given in connection with FIG. 18. The real-time noise dictionary 112 may be provided to the residual noise reduction module 116.

The electronic device 102 may obtain a first speech dictionary 114. For example, the first speech dictionary 114 may be generated by the electronic device 102 or may be received from another electronic device. In some configurations, the electronic device 102 may generate the first speech dictionary 114 based on speech samples. For example, the electronic device 102 may collect and/or receive clean speech signals (e.g., speech signals with high SNR and/or without noise). These clean speech signals may be captured "offline," such as during phone calls where SNR is high, when little or no noise is detected, during a calibration procedure, during a training procedure, etc. Additionally or alternatively, the electronic device 102 may select certain speech signals as clean speech signals when one or more conditions are met (e.g., when captured speech exhibits an SNR that is above a threshold). Additionally or alternatively, the clean speech signals may be captured by another device and transmitted to the electronic device 102. In some configurations, the first speech dictionary 114 may be generated using only the clean speech signals. In other configurations, the first speech dictionary 114 may be generated by adapting a generic speech model in accordance with the clean speech signals.

In some configurations, the first speech dictionary 114 may be a low-rank speech dictionary. For example, a low-rank speech dictionary may be a speech dictionary that coarsely models the speech characteristics of a particular user. In some configurations, the low-rank speech dictionary may be learned through NMF-based speech dictionary learning. For example, obtaining the first speech dictionary 114 may include initializing one or more activation coefficients and/or speech basis functions and updating parameters until convergence. The first speech dictionary 114 may be "low-rank" owing to its size. For example, the first speech dictionary 114 may be relatively small in size and/or may have a relatively small number of linearly independent elements in the dictionary (which may be learned in accordance with an NMF-based approach, for instance). Accordingly, a learned first speech dictionary 114 may be "low-rank." In some configurations, the first speech dictionary 114 may be smaller in size and/or may have fewer linearly independent elements in comparison with and/or relative to the second speech dictionary 120.

The first speech dictionary may be speaker-specific. For example, the first speech dictionary 114 may correspond to a single user and/or may characterize the speech of a single user. It should be noted that multiple first speech dictionaries 114 may be generated and/or received, where each of the first speech dictionaries 114 corresponds to a different user. One example of an approach to obtaining (e.g., determining, learning, etc.) the first speech dictionary 114 is described in connection with FIG. 13 and one example of a first speech dictionary is described in connection with FIG. 14. The first speech dictionary 114 may be provided to the residual noise reduction module 116.

The residual noise reduction module 116 may reduce residual noise based on the real-time noise dictionary 112 and the first speech dictionary 114. Residual noise may be noise remaining in an audio signal. For example, residual noise may be noise that remains after noise suppression has been performed on the noisy speech signal 104. The residual noise reduction module 116 may reduce and/or remove this residual noise from the noise-suppressed speech signal. It should be noted that reducing the residual noise may be performed within or as part of a first modeling stage 126. For example, the first modeling stage 126 may be a stage of NMF-based speech and/or noise modeling. Reducing the residual noise may produce a residual noise-suppressed speech signal 118. For example, the residual noise-suppressed speech signal may be a clean speech signal having very little noise remaining, if any. However, the speech in the residual noise-suppressed speech signal may be damaged due to the residual noise suppression (in addition to initial noise suppression), for example. The residual noise-suppressed speech signal 118 may be provided to the reconstruction module 122.

The electronic device 102 may obtain a second speech dictionary 120. For example, the second speech dictionary 120 may be generated by the electronic device 102 or may be received from another electronic device. In some configurations, the electronic device 102 may generate the second speech dictionary 120 based on speech samples. For example, the electronic device 102 may collect clean speech signals (e.g., speech signals with high SNR and/or without noise). These clean speech signals may be captured "offline," such as during phone calls where SNR is high, when little or no noise is detected, during a calibration procedure, etc. In some configurations, the second speech dictionary 120 may be generated using only the clean speech signals. In other configurations, the second speech dictionary 120 may be generated by adapting a generic speech model in accordance with the clean speech signals. In some configurations, the same clean speech that is used to generate the first speech dictionary 114 may also be used to generate the second speech dictionary 120. In some configurations, the second speech dictionary 120 may more finely characterize the speech of a particular speaker than the first speech dictionary 114.

The second speech dictionary may be speaker-specific. For example, the second speech dictionary 120 may correspond to a single user and/or may characterize the speech of a single user. It should be noted that multiple second speech dictionaries 120 may be generated and/or received, where each of the second speech dictionaries 120 corresponds to a different user. One example of an approach to obtaining (e.g., determining, learning, etc.) the second speech dictionary 120 is described in connection with FIG. 15 and one example of a second speech dictionary is described in connection with FIG. 16. The second speech dictionary 120 may be provided to the reconstruction module 122.

The reconstruction module 122 may generate a reconstructed speech signal 124 based on the residual noise-suppressed speech signal 118 and the second speech dictionary 120. For example, the reconstruction module 122 may reconstruct damaged parts of the speech spectrum. It should be noted that generating the reconstructed speech signal 124 may be performed within or as part of a second modeling stage 128. For example, the second modeling stage 128 may be a stage of NMF-based speech modeling.

In some configurations, the electronic device 102 may encode, transmit, store and/or play back the reconstructed speech signal 124 and/or the residual noise-suppressed speech signal 118. For example, the electronic device 102 may encode the reconstructed speech signal 124 or the residual noise-suppressed speech signal 118 and transmit it to another electronic device (e.g., cellular phone, smartphone, computer, gaming console, etc.). Additionally or alternatively, the electronic device 102 may playback the reconstructed speech signal 124 or the residual noise-suppressed speech signal 118. This may be accomplished by providing the signal to one or more speakers. Additionally or alternatively, the electronic device 102 may store the reconstructed speech signal 124 or the residual noise-suppressed speech signal 118.

Figure 2:
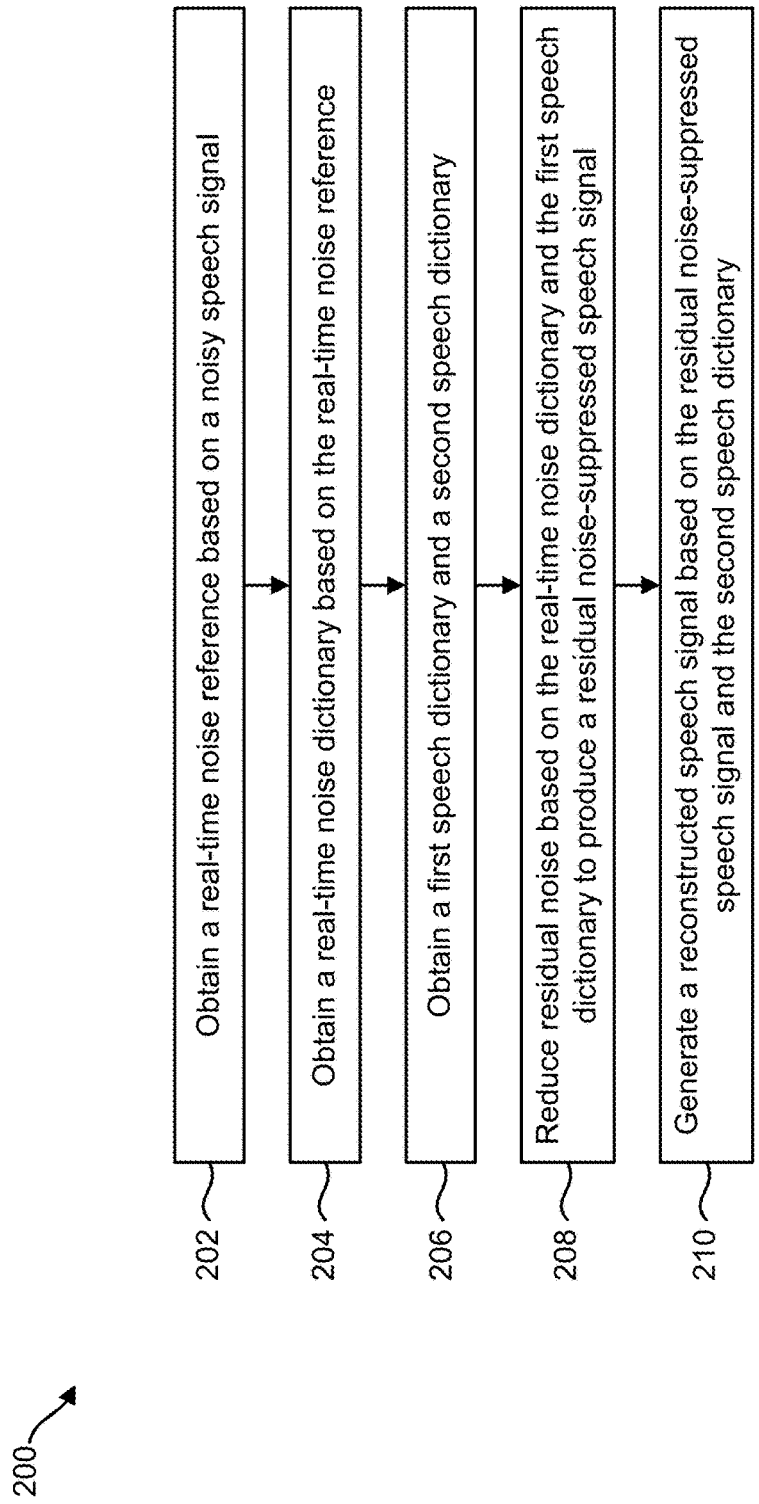
FIG. 2 is a flow diagram illustrating one configuration of a method for speech modeling.

FIG. 2 is a flow diagram illustrating one configuration of a method 200 for speech modeling. The method 200 may be performed by the electronic device 102 described in connection with FIG. 1. The electronic device 102 may obtain 202 a real-time noise reference based on a noisy speech signal 104. This may be accomplished as described above in connection with FIG. 1, for example.

The electronic device 102 may obtain 204 a real-time noise dictionary 112 based on the real-time noise reference 108. This may be accomplished as described above in connection with FIG. 1, for example.

The electronic device 102 may obtain 206 a first speech dictionary 114 and a second speech dictionary 120. This may be accomplished as described above in connection with FIG. 1, for example.

The electronic device 102 may reduce 208 residual noise based on the real-time noise dictionary 112 and the first speech dictionary 114 to produce a residual noise-suppressed speech signal 118. This may be accomplished as described above in connection with FIG. 1, for example. Reducing 208 residual noise may be performed at a first modeling stage 126. The first modeling stage 126 may be based on NMF. In some configurations, reducing 208 residual noise may include fixing a speech and noise dictionary that includes the first speech dictionary 114 and the real-time noise dictionary, initializing activation coefficients and/or updating the activation coefficients until convergence (with a maximum number of iterations, for example). Additionally or alternatively, reducing 208 the residual noise may include creating a filter based on the first speech dictionary, the real-time noise dictionary, an adapted speech activation coefficient and/or an adapted noise activation coefficient. Reducing 208 the residual noise may further include estimating the residual noise-suppressed speech signal based on the filter and a pre-enhanced input.

The electronic device 102 may generate 210 a reconstructed speech signal based on the residual noise suppressed speech signal and the second speech dictionary. This may be accomplished as described in connection with FIG. 1, for example. Generating 210 a reconstructed speech signal may be performed at a second modeling stage 128. The second modeling stage 128 may be based on NMF. In some configurations, generating 210 the reconstructed speech signal may include fixing a sub-band pitch-specific dictionary, updating activation coefficients until convergence and/or generating the reconstructed speech signal 124 based on a pitch-specific dictionary (e.g., an all-sub-band pitch-specific dictionary) and the activation coefficients.

Figure 3:
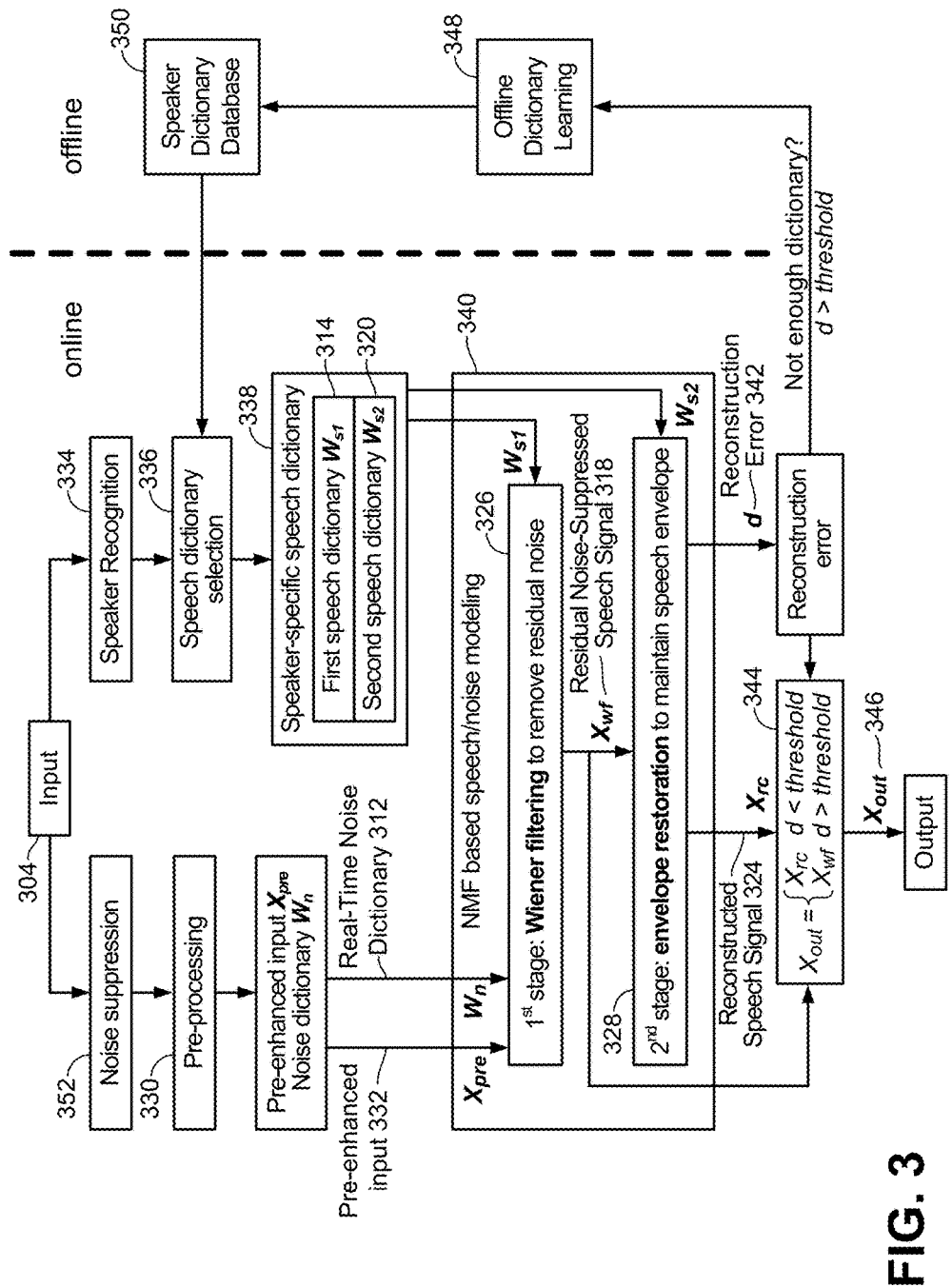
FIG. 3 is a functional block diagram illustrating a more specific overview of some configurations of the systems and methods disclosed herein.

FIG. 3 is a functional block diagram illustrating a more specific overview of some configurations of the systems and methods disclosed herein. One or more of the functions, procedures, parameters, values and/or structures described in connection with FIG. 3 may be examples of one or more of the functions, procedures, parameters, values and/or structures described in connection with one or more of FIGS. 1-2. In particular, FIG. 3 illustrates a noise suppression module 352, a speaker recognition module 334, a pre-processing module 330, a speech dictionary selection module 336, an offline dictionary learning module 348, an NMF based speech/noise modeling module 340 and a signal selection module 344.

A more detailed explanation of the overview is provided as follows. An input 304 (e.g., a noisy speech signal) may be provided to a noise suppression module 352 and to a speaker recognition module 334. The noise suppression module 352 may perform noise suppression on the input 304 (e.g., noisy speech signal). In some configurations, the noise suppression module 352 may perform noise suppression based on multiple input 304 channels (e.g., multiple microphone channels). For example, the noise suppression module 352 may suppress stationary and/or non-stationary noise in the input 304. In one example, the noise suppression module 352 may determine a noise suppression output magnitude. The noise suppression output magnitude may be provided to the pre-processing module 330.

The pre-processing module 330 may obtain a real-time noise reference. For example, the pre-processing module 330 may obtain the real-time noise reference based on a primary channel of the input 304 and the noise suppression output magnitude. The pre-processing module 330 may generate a pre-enhanced input 332 (e.g., $X_{pre}$) based on the primary channel of the input 304 and the real-time noise reference. Additionally, the pre-processing module 330 may obtain a real-time noise dictionary 312 (e.g., $W_n$) online based on the real-time noise reference. A more specific example of noise suppression and pre-processing is described in connection with FIG. 18. The pre-enhanced input 332 and the real-time noise dictionary 312 may be provided to the NMF-based speech/noise modeling module 340.

The speaker recognition module 334 may perform speaker recognition. For example, the speaker recognition module 334 may recognize one or more speakers' voices (e.g., a primary speaker's voice) based on the input 304 and a noise suppression module 352 output. For example, the speaker recognition module 334 may attempt to match one or more characteristics (e.g., spectral envelope, formant peaks, pitch, etc.) of the input 304 and/or noise suppression module 352 output to one or more known speaker profiles. If a speaker is recognized, the speaker recognition module 334 may provide an indicator of a speaker identification to the speech dictionary selection module 336. If the speaker recognition module 334 does not recognize the speaker, the speaker recognition module 334 may indicate that the input 304 does not match any known (e.g., recorded) speaker.

Regarding the offline dictionary learning module 348, a speaker dictionary database 350 may be initialized with a generic speaker dictionary. The offline dictionary learning module 348 may learn a specific speaker's speech dictionary when a condition is satisfied (e.g., when an SNR measurement of input speech is above an SNR threshold, for example).

The speech dictionary selection module 336 may obtain a first speech dictionary 314 (e.g., $W_{s1}$) for first modeling stage speech modeling. For example, the speech dictionary selection module 336 may retrieve the first speech dictionary 314 from the speaker dictionary database 350 based on the identified speaker (if any). The speech dictionary selection module 336 (e.g., speaker-specific speech dictionary selection module 336) may also select a second speech dictionary 320 (e.g., $W_{s2}$) for second modeling stage speech modeling. For example, the speech dictionary selection module 336 may retrieve the second speech dictionary 320 from the speaker dictionary database 350 based on the identified speaker (if any). In some configurations, the second speech dictionary 320 may be an envelope-pitch specific dictionary for second modeling stage speech modeling. As illustrated in FIG. 3, the first speech dictionary 314 and the second speech dictionary 320 may each be based on (e.g., subsets of) a speaker-specific speech dictionary 338 in some configurations. The first speech dictionary 314 and the second speech dictionary 320 may be provided to the NMF based speech/noise modeling module 340.

The NMF based speech/noise modeling module 340 may reduce (e.g., remove) residual noise and generate a reconstructed speech signal 324. Reducing residual noise may be performed at a first modeling stage 326 and generating the reconstructed speech signal 324 may be performed at a second modeling stage 328.

The first modeling stage 326 may include NMF based Wiener filtering. For example, for a given trained speech/noise dictionary (e.g., $W=[W_{s1},W_n]$), the NMF based speech/noise modeling module 340 may model each frame of noisy speech spectrum as $X \approx WH$. $H=[H_s,H_n]$ may represent the activation weights of each dictionary (where $H_s$ are the first speech dictionary activation weights and $H_n$ are the real-time noise dictionary activation weights). The NMF based speech/noise modeling module 340 may generate a residual noise-suppressed speech signal 318 (e.g., $X_{wf}$) using a Weiner filtering approach (e.g., $$M_s = \frac{W_s H_s}{WH},$$

$X_{wf}=M_s \cdot X_{pre}$, where $\cdot \times$ is an element-wise multiplication).

In some configurations, the NMF based speech/noise modeling module 340 may perform NMF based envelope restoration at the second modeling stage 328 as follows. For a given second speech dictionary 320 $W_{s2}$ (e.g., speaker-specific speech dictionary), the NMF based speech/noise modeling module 340 may model high SNR sub-band speech spectrum to generate a reconstructed speech signal 324 (e.g., reconstructed all band speech $X_{rc}=W_{s2}H$).

The residual noise-suppressed speech signal 318 and the reconstructed speech signal 324 may optionally be provided to the signal selection module 344. The signal selection module 344 may select one of the residual noise-suppressed speech signal 318 and the reconstructed speech signal 324 as an output 346 (e.g., output speech signal) based on a reconstruction error 342. For example, if the reconstruction error 342 (e.g., $d_{IS}(X|WH)$, $d_{IS}$ or d) is high (e.g., greater than a threshold), then the residual noise-suppressed speech signal 318 (e.g., Wiener filtering output $X_{wf}$) may be selected as the output 346 (e.g., $X_{out}$, an output speech signal, etc.). For example, $$X_{out} = \begin{cases} X_{rc} & d_{IS} < \text{threshold} \\ X_{wf} & d_{IS} > \text{threshold} \end{cases}.$$

Additionally, if the reconstruction error 342 $d_{IS}(X|WH)$ is high (e.g., greater than the same or a different threshold), the NMF based speech/noise modeling module 340 may activate the offline dictionary learning module 348 to further train a speech dictionary and/or to train one or more additional speech dictionaries.

The offline dictionary learning module 348 may perform dictionary learning and/or training for the first modeling stage 326 and/or for the second modeling stage 328. More detailed examples of dictionary learning and/or training are provided in connection with FIGS. 13-16.

In some configurations, the systems and methods may operate in accordance with one or more of the following principles. The first modeling stage 326 processing may use an NMF procedure to get and/or separate a speech component from noise before applying a post-filter. A real-time noise reference may be utilized together with a pre-defined speech dictionary (e.g., the first speech dictionary 314). For example, a real-time noise reference and a speech dictionary may be obtained, which may be used together in the context of a matching pursuit such as NMF.

In some configurations, a post-filter gain may be obtained per frequency bin based on an assumption that speech power can be estimated by subtracting noise power from the input power in that bin. In accordance with some configurations of the systems and methods disclosed herein, however, the subbands may be learned to explain (e.g., describe, represent, etc.) the target speaker as well as possible with given training data and to estimate and/or separate speech from noise before applying a post-filter based on more correctly estimated speech power and noise power. This approach may be successful because it utilizes a very accurate real-time noise reference spectrum and, with a well-trained target speaker's speech dictionary, the speech spectrum may be estimated and/or separated better than in the simpler conventional approach. It should be noted that to construct a complete speech spectrum dictionary with a limited size (e.g., amount) of training data, some subband atoms may be combined to explain (e.g., describe, represent, etc.) all the training data. Theoretically, if an almost unlimited number of basis functions and/or atoms are obtained and/or available for the dictionary, nearly every snapshot of the user's spectrum may be available for all different kind of utterances, pitches, prosodies, etc. However, this may be difficult unless there is some way of reducing the size to a reasonable level with some constraints.

The second modeling stage 328 processing may be more geared towards reconstructing an envelope. Since the first speech dictionary 314 (that may be applied at the first modeling stage 326) and/or atom may be localized in some frequency ranges due to the limited training data size, if some bands are dominated by noise and if there is not a speech atom wide enough to cover not only those bands but also speech dominant frequency bands, then it may be difficult to restore that band (as in the conventional post-filtering approach, for instance). However, it should be noted that there may still be a better chance to restore speech (than in the conventional approach) as long as there are enough speech dominant bins for the target speaker dictionary. Accordingly, a dictionary may be utilized that covers a much wider range. A spectrum snapshot may be beneficial, since it covers the whole spectrum.

Accordingly, in the second modeling stage 328 processing, it may be beneficial to utilize a spectrum snapshot with some reasonable constraints such as pitch and/or possibly formant structure. The first modeling stage 326 output (e.g., the residual noise-suppressed speech signal 318) may be very helpful in terms of estimating such features used for constraints. In some configurations, the spectrum snapshots may be extracted only corresponding to estimated pitch and/or formant structure, etc. These may be utilized as a dictionary (e.g., a pitch-specific dictionary) to estimate and/or separate speech from noise. With these constraints, the dictionary may be a reasonable size and NMF or any proper matching pursuit algorithm may be applied with much less concerns on memory and computation, and yet the envelope of the speech of the target speaker may be restored. Accordingly, the systems and methods disclosed herein may provide a novel way of having a reasonable dictionary size with wider spectrum coverage with reasonable complexity and memory size based on the aforementioned constraints and of restoring the envelope based on the dictionary.

In some configurations, one or more methods may include one or more of the following steps: obtaining a speech dictionary (e.g., the first speech dictionary 314); performing a first modeling stage 326 processing that includes performing a matching pursuit (e.g., NMF) based on a real-time noise reference and a speech dictionary (e.g., the first speech dictionary 314) to obtain a speech component from a noisy signal; applying a post filter; obtaining another speech dictionary (e.g., a second speech dictionary 320) with one or more constraints; and performing a second modeling stage 328 processing that includes performing a matching pursuit (e.g., NMF) to restore a speech envelope. The systems and methods may additionally provide electronic devices with components (e.g., circuitry) that perform one or more of the foregoing procedures, computer-readable media with instructions that cause an electronic device to perform one or more of the foregoing procedures and/or apparatus with means for performing one or more of the foregoing procedures.

Figure 4:
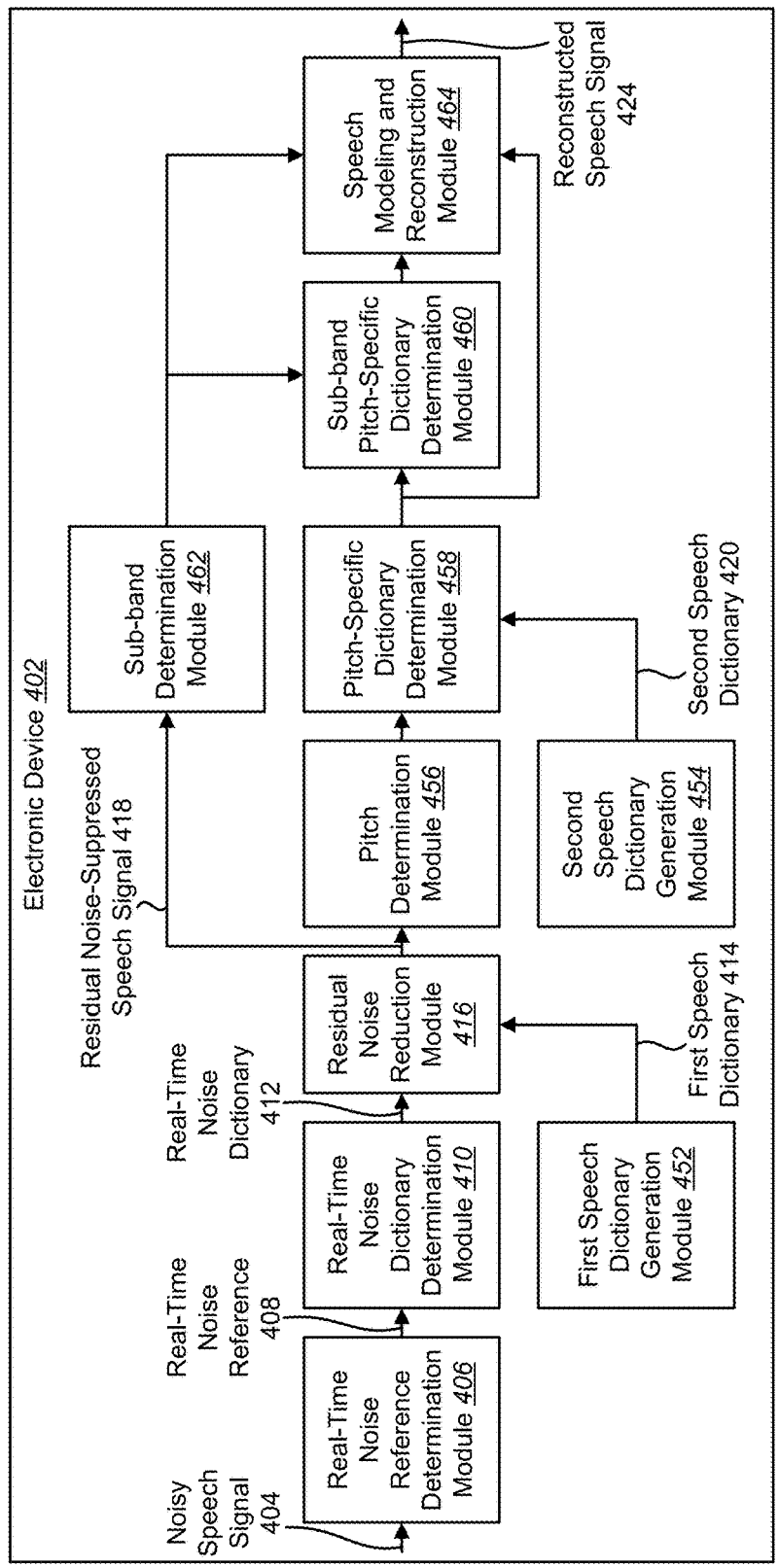
FIG. 4 is a block diagram illustrating another configuration of an electronic device in which systems and methods for speaker dictionary based speech modeling may be implemented.

FIG. 4 is a block diagram illustrating another configuration of an electronic device 402 in which systems and methods for speaker dictionary based speech modeling may be implemented. The electronic device 402 described in connection with FIG. 4 may be one example of the electronic device 102 described in connection with FIG. 1.

The electronic device 402 may include one or more of a real-time noise reference determination module 406, a real-time noise dictionary determination module 410, a first speech dictionary generation module 452, a residual noise reduction module 416, a pitch determination module 456, a second speech dictionary generation module 454, a pitch-specific dictionary determination module 458, a sub-band determination module 462, sub-band pitch-specific dictionary determination module 460 and a speech modeling and reconstruction module 464. The real-time noise reference determination module 406, the real-time noise dictionary determination module 410 and the residual noise reduction module 416 may be examples of corresponding components described in connection with FIG. 1.

In some configurations, the pitch determination module 456, the pitch-specific dictionary determination module 458, the sub-band determination module 462, the sub-band pitch-specific dictionary determination module 460 and the speech modeling and reconstruction module 464 may be included within the reconstruction module 122 described in connection with FIG. 1. It should be noted that one or more of the modules described in connection with FIG. 4 may be optional. Furthermore, one or more of the modules may be combined or divided in some configurations. More specific examples of one or more of the functions, procedures, parameters, values and/or structures described in connection with FIG. 4 may be given in connection with one or more of FIGS. 5, 10, 12-13, 15 and 17-21.

The electronic device 402 may obtain a noisy speech signal 404. This may be accomplished as described in connection with FIG. 1. The noisy speech signal 404 (or a signal based on the noisy speech signal 404) may be provided to the real-time noise reference determination module 406.

The real-time noise reference determination module 406 may obtain a real-time noise reference 408 based on the noisy speech signal 404. This may be accomplished as described in connection with FIG. 1. A more specific example of an approach for obtaining the real-time noise reference 408 is given in connection with FIG. 18. The real-time noise reference 408 may be provided to the real-time noise dictionary determination module 410.

The real-time noise dictionary determination module 410 may obtain a real-time noise dictionary 412 based on the real-time noise reference 408. This may be accomplished as described in connection with FIG. 1. A more specific example of an approach for obtaining the real-time noise dictionary 412 is given in connection with FIG. 18. The real-time noise dictionary 412 may be provided to the residual noise reduction module 416.

The first speech dictionary generation module 452 may obtain a first speech dictionary 414. For example, the first speech dictionary generation module 452 may build and/or train a first dictionary (e.g., a set of basis functions) that models the speech of one or more speakers (e.g., users). Generating the first speech dictionary 414 may be accomplished as described in connection with FIG. 1. The first speech dictionary generation module 452 may additionally or alternatively select a first speech dictionary 414 corresponding to a current user.

One example of an approach to obtaining (e.g., determining, learning, generating, etc.) the first speech dictionary 414 is described in connection with FIG. 13 and one example of a first speech dictionary is described in connection with FIG. 14. The first speech dictionary 414 may be provided to the residual noise reduction module 416.

The residual noise reduction module 416 may reduce residual noise based on the real-time noise dictionary 412 and the first speech dictionary 414. This may be accomplished as described in connection with FIG. 1. The residual noise-suppressed speech signal 418 may be provided to the sub-band determination module 462 and/or to the pitch determination module 456.

The pitch determination module 456 may obtain a pitch based on the residual noise-suppressed speech signal 418. For example, the pitch determination module 456 may determine a pitch for each frame of the residual noise-suppressed speech signal 418. The determined pitch may be a fundamental pitch (e.g., fundamental pitch evolution) in each frame. An example of the pitch determination module 456 is described in connection with FIG. 21. The pitch may be provided to the pitch-specific dictionary determination module 458.

In some configurations, the pitch determination module 456 may determine the pitch by performing a time-domain autocorrelation of the residual noise-suppressed speech signal 418 in the frame and determining a period (e.g., number of samples) between pitch peaks. Additionally or alternatively, the pitch determination module 456 may transform the residual noise-suppressed speech signal 418 into the frequency domain and determine the frequency at which a maximum peak magnitude occurs.

In some configurations, the pitch determination module 456 may transform the residual noise-suppressed signal 418 into the frequency domain and determine the fundamental frequency as follows. The pitch determination module 456 may determine the fundamental frequency by determining and/or removing non-harmonic peaks, peaks that are small (e.g., less than a threshold) relative to a maximum peak, peaks with low (e.g., less than a threshold) tonality, peaks that are too close to (e.g., within a frequency range of) stronger peaks and/or peaks that are continuous from non-harmonic peaks of a previous frame. Then, the pitch determination module 456 may perform harmonic matching to determine the fundamental frequency. For example, the pitch determination module 456 may find the fundamental frequency with the remaining peaks (e.g., $f_i$), where the fundamental frequency (e.g., $f_0$) is the generalized greatest common divisor for the remaining peaks (e.g., the fractional part of $f_i/f_0$, denoted $\{f_i/f_0\}_r$, as small as possible for each $f_i$). For example, $$f_0 = \arg\max_{f_0} \tilde{M}(f_0).$$

This may be utilized to find $f_0$ that best matches the observed peak frequencies $\{f_i\}$ in the sense that $f_0$ makes each $\{f_i/f_0\}_r$ as small as possible over a given range for $f_0$. $\tilde{M}(f_0)$ denotes the harmonic matching spectrum (e.g., a weighted harmonic matching score), where $\tilde{M}(f_0)=\Sigma_i w(A_i)g(\{f_i/f_0\}_r)$. This is a sum of harmonic matching scores for peaks $f_i$ weighted by their amplitudes $A_i$. In some configurations, the weighting function is $w(A_i)=A_i^{0.5}$, which provides a weight for amplitude. $g(\{f_i/f_0\}_r)$ denotes a harmonic matching measure, which may be $$g(\{f_i/f_0\}_r) = \frac{1}{(1+e^{30(\{f_i/f_0\}_r-0.2)})},$$

for example. This provides a score between 0 and 1, which reflects the extent to which $f_i/f_0$ is close to some integer.

The second speech dictionary generation module 454 may obtain (e.g., generate, build and/or train) a second speech dictionary 420 (e.g., a set of basis functions) that models the speech of one or more speakers (e.g., users). In some configurations, generating the second speech dictionary 420 may be accomplished as described in connection with FIG. 1. In some examples, obtaining the second speech dictionary may include estimating a harmonicity and a pitch for a plurality of speaker-specific speech magnitude spectra. Obtaining the second speech dictionary may also include selecting, from the speaker-specific speech magnitude spectra, speech spectra with corresponding harmonicities above a harmonicity threshold. Obtaining the second speech dictionary may further include labeling each of the selected speech spectra with a corresponding pitch.

The second speech dictionary generation module 454 may additionally or alternatively select a second speech dictionary 420 corresponding to a current user. One example of an approach to obtaining (e.g., determining, learning, etc.) the second speech dictionary 420 is described in connection with FIG. 15 and one example of a second speech dictionary is described in connection with FIG. 16. The second speech dictionary 420 may be a pitch-envelope specific speech dictionary that is speaker-specific. The second speech dictionary 420 may be provided to the pitch-specific dictionary determination module 458.

The pitch-specific dictionary determination module 458 may determine a pitch-specific dictionary from a speaker-specific dictionary (e.g., the second speech dictionary 420) based on the pitch. For example, the pitch-specific dictionary determination module 458 may select a subset of basis functions from the second speech dictionary 420 based on the pitch in order to determine the pitch-specific dictionary. The pitch-specific dictionary may be provided to the sub-band pitch-specific dictionary determination module 460 and to the speech modeling and reconstruction module 464.

The sub-band determination module 462 may determine one or more sub-bands based on the residual noise-suppressed speech signal 418. For example, the sub-band determination module 462 may select a sub-band (e.g., frequency bin) based on the residual noise-suppressed speech signal 418. For instance, the sub-band determination module 462 may select only one or more subbands of the residual noise-suppressed speech signal 418 that exhibit an SNR that is above a threshold. An example of the sub-band determination module 462 is described in connection with FIG. 21. The one or more sub-bands may be provided to the sub-band pitch-specific dictionary determination module 460 and to the speech modeling and reconstruction module 464.

The sub-band pitch-specific dictionary determination module 460 may determine a sub-band pitch specific dictionary from the pitch-specific dictionary based on the one or more subbands (e.g., bin-wise signal-to-noise ratios (SNRs)). For example, the sub-band pitch-specific dictionary determination module 460 may select one or more basis functions from the pitch-specific dictionary based on the sub-band(s) to produce the sub-band pitch-specific dictionary. The sub-band pitch-specific dictionary may be provided to the speech modeling and reconstruction module 464.

The speech modeling and reconstruction module 464 may generate a reconstructed speech signal 424 based on the sub-band pitch-specific dictionary and the sub-bands. For example, the speech modeling and reconstruction module 464 may fix the sub-band pitch-specific dictionary and update activation coefficients until convergence. The speech modeling and reconstruction module 464 may also generate the reconstructed speech signal based on the pitch-specific dictionary and the activation coefficients. Examples of the speech modeling and reconstruction module 464 are described in connection with FIG. 21.

In some configurations, the electronic device 402 may select between the residual noise suppressed speech signal 418 and the reconstructed speech signal 424 based on a reconstruction error and one or more thresholds. For example, the electronic device 402 may select the reconstructed speech signal 424 if the reconstruction error is below a threshold. Alternatively, the electronic device 402 may select the residual noise-suppressed speech signal 418 if the reconstruction error is above (e.g., greater than or equal to) the threshold. The electronic device 402 may output the selected signal in some configurations.

Figure 5:
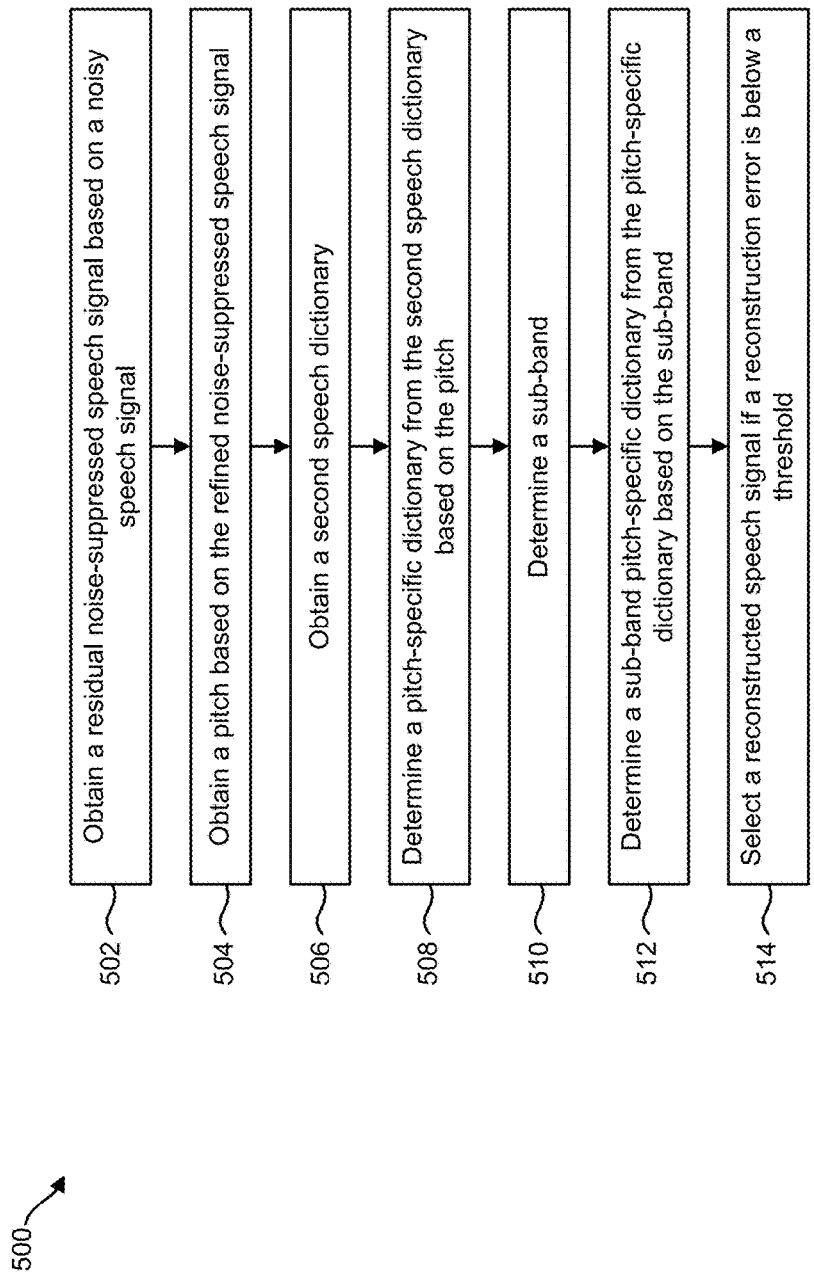
FIG. 5 is a flow diagram illustrating another configuration of a method for speech modeling.

FIG. 5 is a flow diagram illustrating another configuration of a method 500 for speech modeling. The electronic device 402 may obtain 502 a residual noise-suppressed speech signal 418 based on a noisy speech signal 404. This may be accomplished as described above in connection with FIG. 4, for example.

The electronic device 402 may obtain 504 a pitch based on the residual noise-suppressed speech signal 418. This may be accomplished as described above in connection with FIG. 4, for example.

The electronic device 402 may obtain 506 a second speech dictionary 420. This may be accomplished as described above in connection with FIG. 4, for example.

The electronic device 402 may determine 508 a pitch-specific dictionary from the second speech dictionary 420 based on the pitch. This may be accomplished as described above in connection with FIG. 4, for example.

The electronic device 402 may determine 510 one or more sub-bands based on the residual noise-suppressed speech signal 418. This may be accomplished as described above in connection with FIG. 4, for example.

The electronic device 402 may determine 512 a sub-band pitch specific dictionary from the pitch-specific dictionary based on the one or more subbands. This may be accomplished as described above in connection with FIG. 4, for example.

The electronic device 402 may select 514 a reconstructed speech signal if a reconstruction error is below a threshold. This may be accomplished as described above in connection with FIG. 4, for example.

Figure 6:
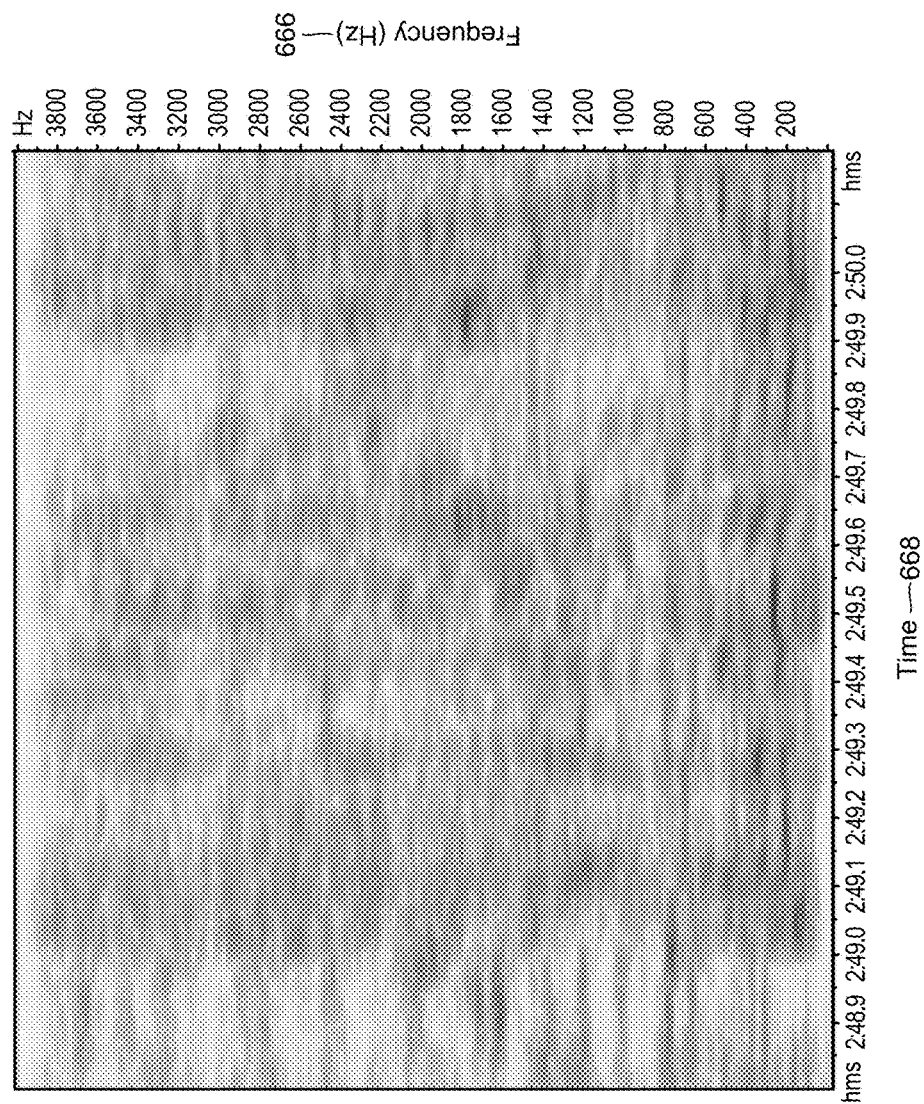
FIG. 6 is a graph illustrating one example of a noisy speech signal.

FIG. 6 is a graph illustrating one example of a noisy speech signal. In particular, the graph is a spectrogram in frequency (in Hertz (Hz)) 666 over time 668 (in hours, minutes and seconds (hms), where 2:50:0 means 2 minutes 50.0 seconds, for instance). In this example, the noisy speech signal is a primary channel input that includes a speech signal in the presence of music noise.

Figure 7:
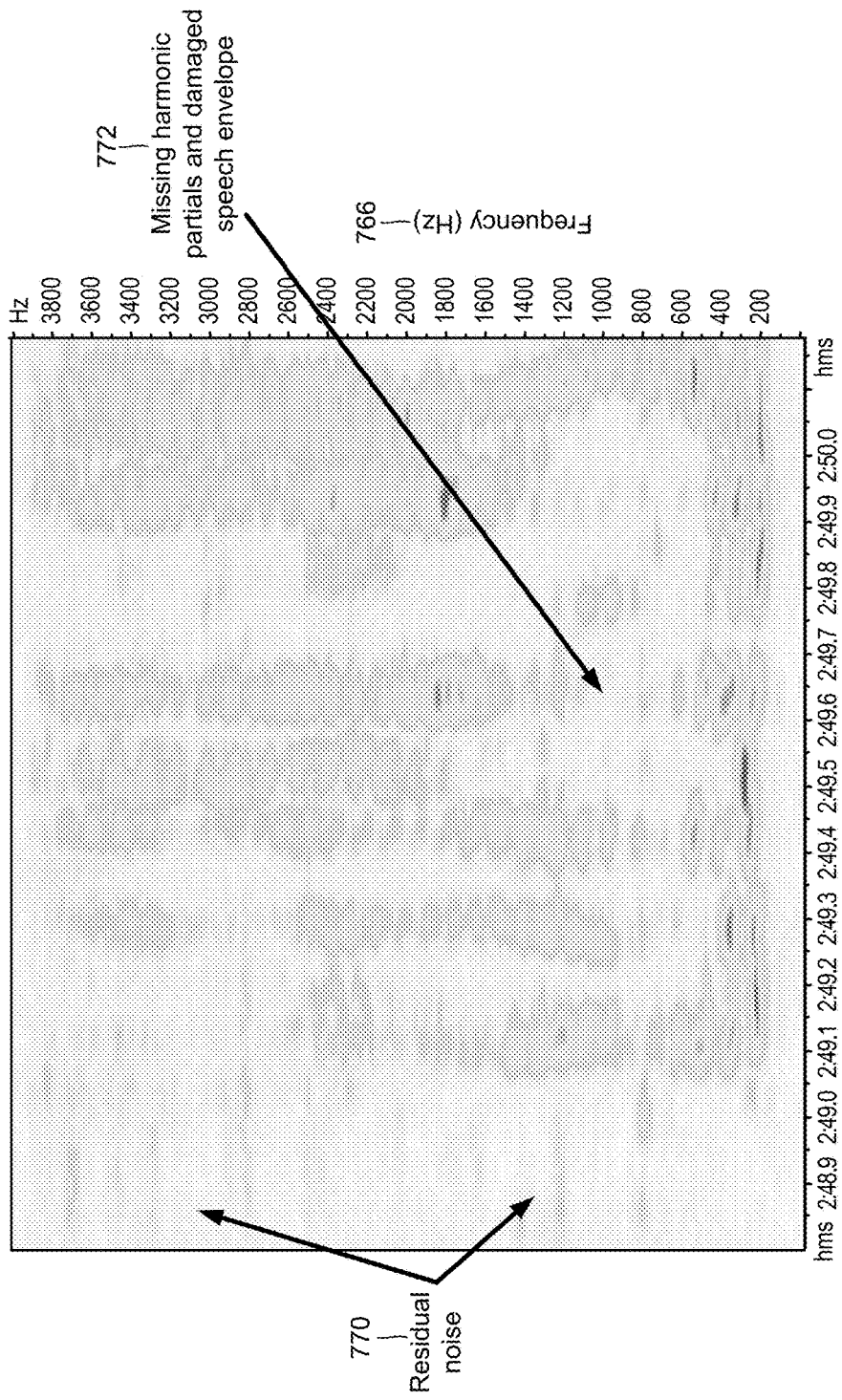
FIG. 7 is a graph illustrating one example of a noise-suppressed speech signal.

FIG. 7 is a graph illustrating one example of a noise-suppressed speech signal. In particular, the graph is a spectrogram in frequency (Hz) 766 over time 768. In this example, the noise-suppressed signal is a de-noised output that includes a speech signal with some residual noise 770 remaining from the music noise. FIG. 7 further illustrates some missing harmonic partials and a damaged speech envelope 772. For example, problems with some types of noise suppression may include residual noise 770, missing harmonic partials and/or a damaged speech envelope 772.

Figure 8:
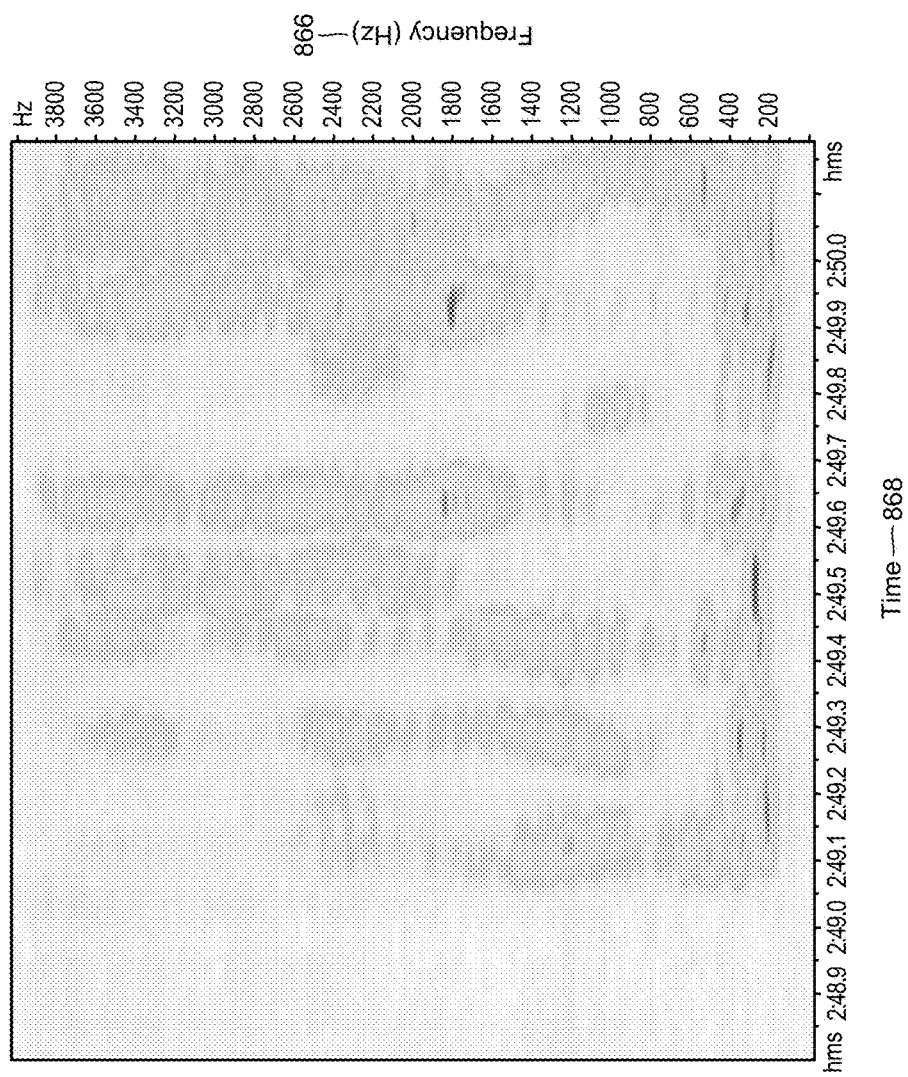
FIG. 8 is a graph illustrating one example of a signal after first modeling stage processing in accordance with the systems and methods disclosed herein.

FIG. 8 is a graph illustrating one example of a signal after first modeling stage processing in accordance with the systems and methods disclosed herein. In particular, the graph is a spectrogram in frequency (Hz) 866 over time 868. In this example, the spectrogram illustrates a first modeling stage NMF Wiener filtering output. FIG. 8 corresponds to the examples given in FIGS. 6-7. In particular, this spectrogram illustrates a resulting residual noise-suppressed speech signal obtained from a speech signal corrupted with music noise after noise suppression and first modeling stage processing in accordance with the systems and methods disclosed herein. As can be observed, residual noise and isolated noise peaks have been reduced and/or removed.

Figure 9:
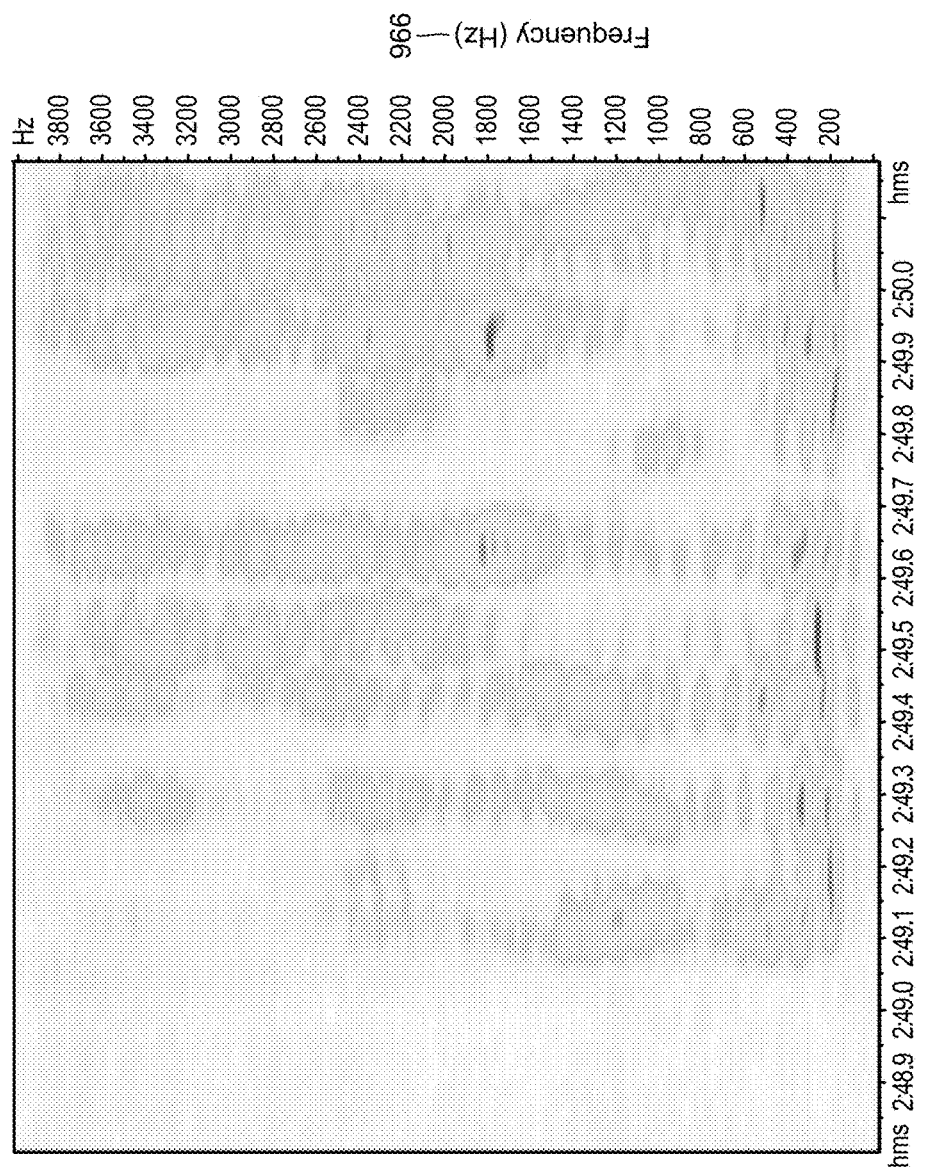
FIG. 9 is a graph illustrating one example of a signal after second modeling stage processing in accordance with the systems and methods disclosed herein.

FIG. 9 is a graph illustrating one example of a signal after second modeling stage processing in accordance with the systems and methods disclosed herein. In particular, the graph is a spectrogram in frequency (Hz) 966 over time 968. In this example, the spectrogram illustrates a second modeling stage NMF envelope restoration output (e.g., a reconstructed speech signal). FIG. 9 corresponds to the examples given in FIGS. 6-8. In particular, this spectrogram illustrates a resulting reconstructed speech signal obtained from a speech signal corrupted with music noise after noise suppression, first modeling stage processing and second modeling stage processing in accordance with the systems and methods disclosed herein. As can be observed, harmonic partials have been restored and a clean voiced speech envelope has been maintained.

Figure 10:
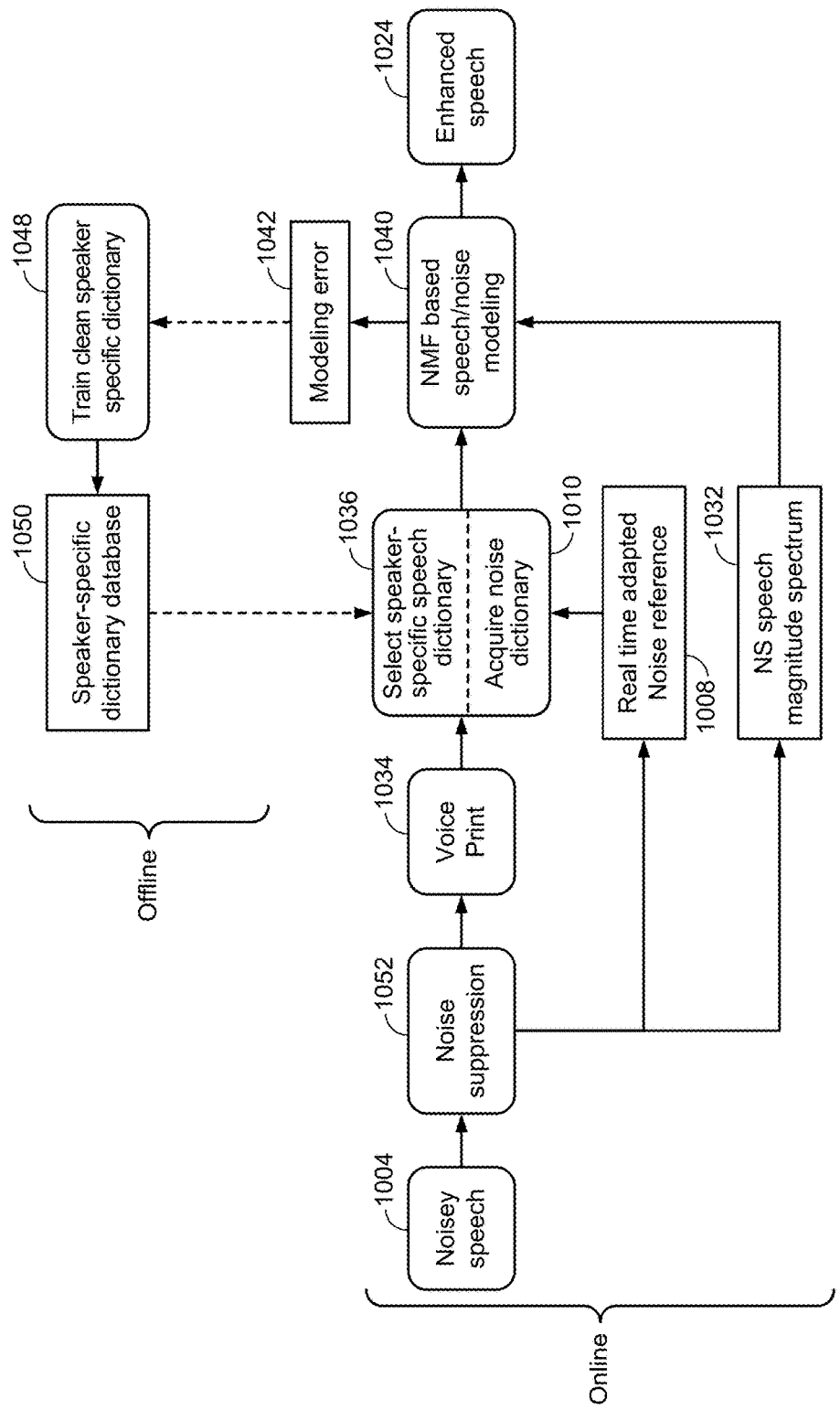
FIG. 10 is a block diagram illustrating one example of an overview of some configurations of the systems and methods disclosed herein.

FIG. 10 is a block diagram illustrating one example of an overview of some configurations of the systems and methods disclosed herein. One or more of the functions, procedures, parameters, values and/or structures described in connection with FIG. 10 may be examples of one or more of the functions, procedures, parameters, values and/or structure described in connection with one or more of FIGS. 1-5. This correspondence may be indicated with like item numbers.

In the configuration illustrated in FIG. 10, a noisy speech signal 1004 is provided to a noise suppression module 1052. The noise suppression module 1052 may suppress noise in the noisy speech signal 1004 as described above. In some configurations, the noise suppression module 1052 may produce a real-time adapted noise reference signal 1008 (e.g., a real time noise reference) and/or a noise suppressed speech magnitude spectrum 1032. For example, in order to suppress noise in the noisy speech signal 1004, the noise suppression module 1052 may determine a noise reference 1008 in real time. The noise reference 1008 may be an estimate of noise (e.g., noise characteristics) in the noisy speech signal 1004. The real-time adapted noise reference signal 1008 may be utilized (by the noise dictionary module 1010) to acquire a noise dictionary. The magnitude spectrum 1032 of the noise-suppressed speech signal may be provided to the NMF based speech/noise modeling module 1040.

The noise-suppressed speech signal may be provided to a voice print module 1034. The voice print module 1034 may perform speaker recognition. For example, the voice print module 1034 may recognize one or more speakers based on characteristics from the speech signal. The voice print module 1034 may be one example of the speaker recognition module 334 described in connection with FIG. 3. The voice print module 1034 may provide speaker recognition information to a speech dictionary module 1036/noise dictionary module 1010.

The speech dictionary module 1036/noise dictionary module 1010 may select one or more speaker-specific dictionaries based on the speaker recognition information and/or may acquire a noise dictionary. For example, the speaker-specific speech dictionary selection module may select a first dictionary and a second dictionary based on the speaker recognition information. For instance, if the current speaker is recognized, then the speech dictionary module 1036/noise dictionary module 1010 may select one or more dictionaries corresponding to that particular speaker (e.g., dictionaries that have been specifically trained to represent speech characteristics of a particular speaker). However, if the current speaker is not recognized, the speech dictionary module 1036/noise dictionary module 1010 may select one or more generic dictionaries.

The one or more dictionaries may be selected from a speaker-specific dictionary database 1050. For example, an electronic device may train one or more clean speaker-specific dictionaries offline. For example, the electronic device may train one or more dictionaries (e.g., a first dictionary and a second dictionary) for each recognized speaker based on clean speech samples. "Clean" speech samples may be speech samples with a low level of noise (e.g., samples with an SNR greater than some particular threshold).

The speech dictionary module 1036/noise dictionary module 1010 may additionally obtain a real-time noise dictionary. Obtaining the real-time noise dictionary may be based on the real-time (adapted) noise reference 1008. The real-time noise dictionary may represent one or more characteristics of noise occurring in the noisy speech signal. Accordingly, the speech dictionary module 1036/noise dictionary module 1010 may utilize both (e.g., combine) the speaker-specific dictionary and the real-time noise dictionary. The first speech dictionary, the second speech dictionary and the real-time noise dictionary may be provided to the NMF based speech/noise modeling module 1040.

The NMF based speech/noise modeling module 1040 may perform first modeling stage and/or second modeling stage processing in accordance with the systems and methods disclosed herein. More detail of examples of the first modeling stage processing (e.g., first modeling stage NMF Wiener filtering) is provided in connection with FIGS. 15 and 17-18. More detail of an example of the second modeling stage processing (e.g., second modeling stage NMF speech modeling) is provided in connection with FIG. 19. The NMF based speech/noise modeling module 1040 may produce enhanced speech 1024 (e.g., a residual noise-suppressed speech signal and/or a reconstructed speech signal).

The NMF based speech/noise modeling module 1040 may produce (e.g., calculate, estimate, etc.) a modeling error 1042 or reconstruction error. The modeling error 1042 may be provided to the clean speaker-specific dictionary training module 1048. As described above, the clean speaker-specific dictionary training module 1048 may train one or more dictionaries corresponding to one or more speakers. This may be performed offline. The other operations described in connection with FIG. 10 (e.g., in the lower portion of FIG. 10) may be performed online (e.g., in real time, during noise suppression use, etc.).

Figure 11:
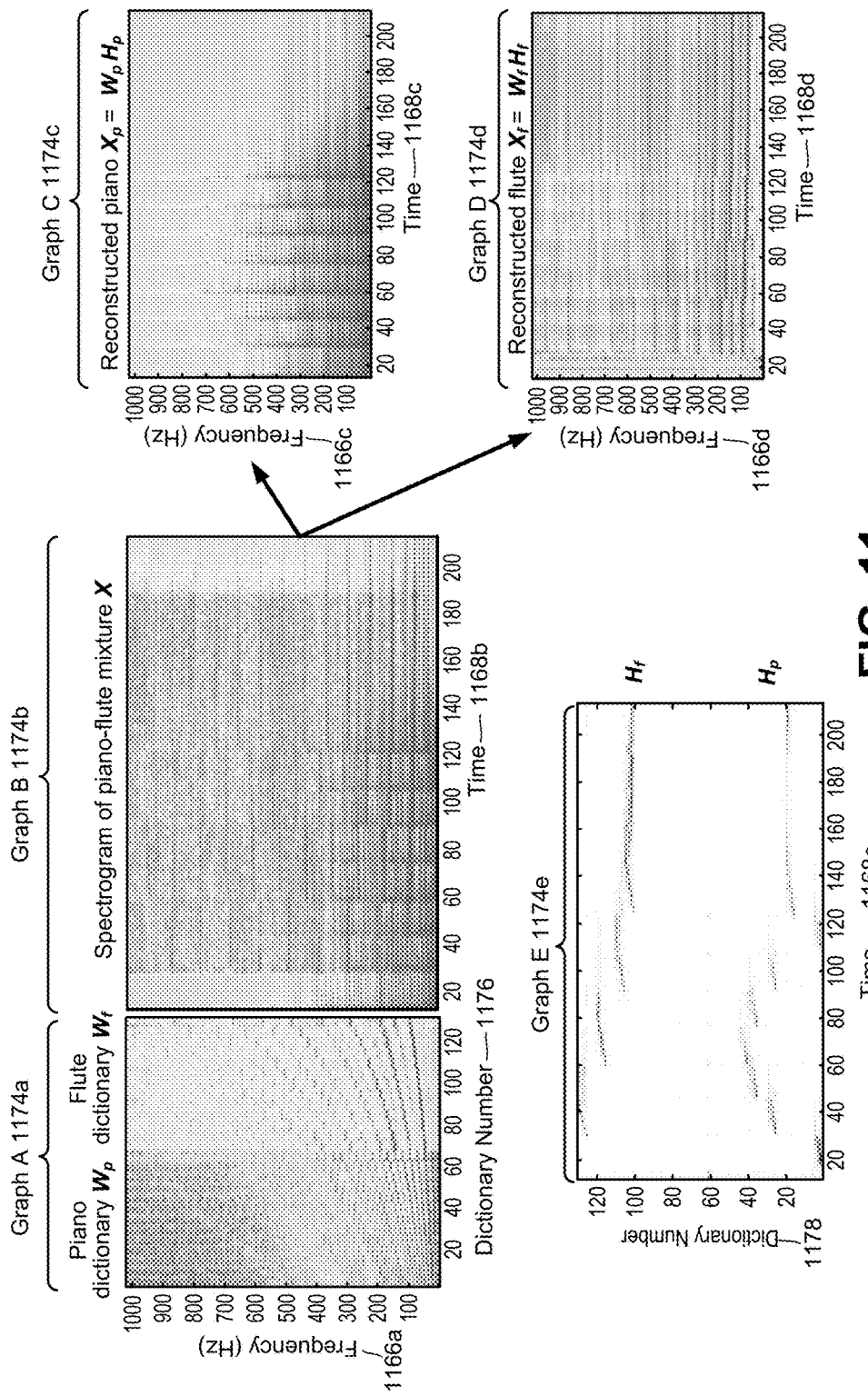
FIG. 11 is a diagram illustrating one example of supervised non-negative matrix factorization (NMF) based audio source separation with piano and flute audio.

FIG. 11 is a diagram illustrating one example of supervised NMF based audio source separation with piano and flute audio. FIG. 11 includes graph A 1174a, graph B 1174b, graph C 1174c, graph D 1174d and graph E 1174e. Graph A 1174a is illustrated in frequency (Hz) 1166a over dictionary number 1176, graph B 1174b is illustrated in frequency (Hz) 1166a over time 1168b, graph C 1174c is illustrated in frequency (Hz) 1166c over time 1168c, graph D 1174d is illustrated in frequency (Hz) 1166d over time 1168d and graph E 1174e is illustrated in dictionary number 1178 over time 1168e. In particular, FIG. 11 illustrates a piano dictionary $W_p$ and a flute dictionary $W_f$ in graph A 1174a, a spectrogram of a piano-flute mixture X in graph B 1174b, corresponding flute activation coefficients $H_f$ and corresponding piano activation coefficients $H_p$ in graph E 1174e, reconstructed piano $X_p = W_p H_p$ in graph C 1174c and reconstructed flute $X_f = W_f H_f$ in graph D 1174d.

Specifically, a mixture spectrogram X in graph B 1174b, a pre-trained dictionary $W=[W_p,W_f]$ in graph A 1174a and activation coefficients $H=[H_p,H_f]$ in graph E 1174e are illustrated. The mixture may be modeled as $X \approx WH$. Each column vector of the mixture X is represented as non-negative linear combination of the non-negative dictionary W. Each column vector of H represents the activation weights of each dictionary of W.

The mixture X may be decomposed into piano and flute signals by finding activation coefficient $H_p$ and $H_f$. H may be determined or found by minimizing a cost function defined by $$d_{IS}(X|WH) = \frac{X}{WH} - \log\frac{X}{WH} - 1,$$

where $d_{IS}$ stands for Itakura-Saito distance. Once $H_p$ and $H_f$ are obtained, the piano and flute are reconstructed as $W_p H_p$ and $W_f H_f$, respectively.

Figure 12:
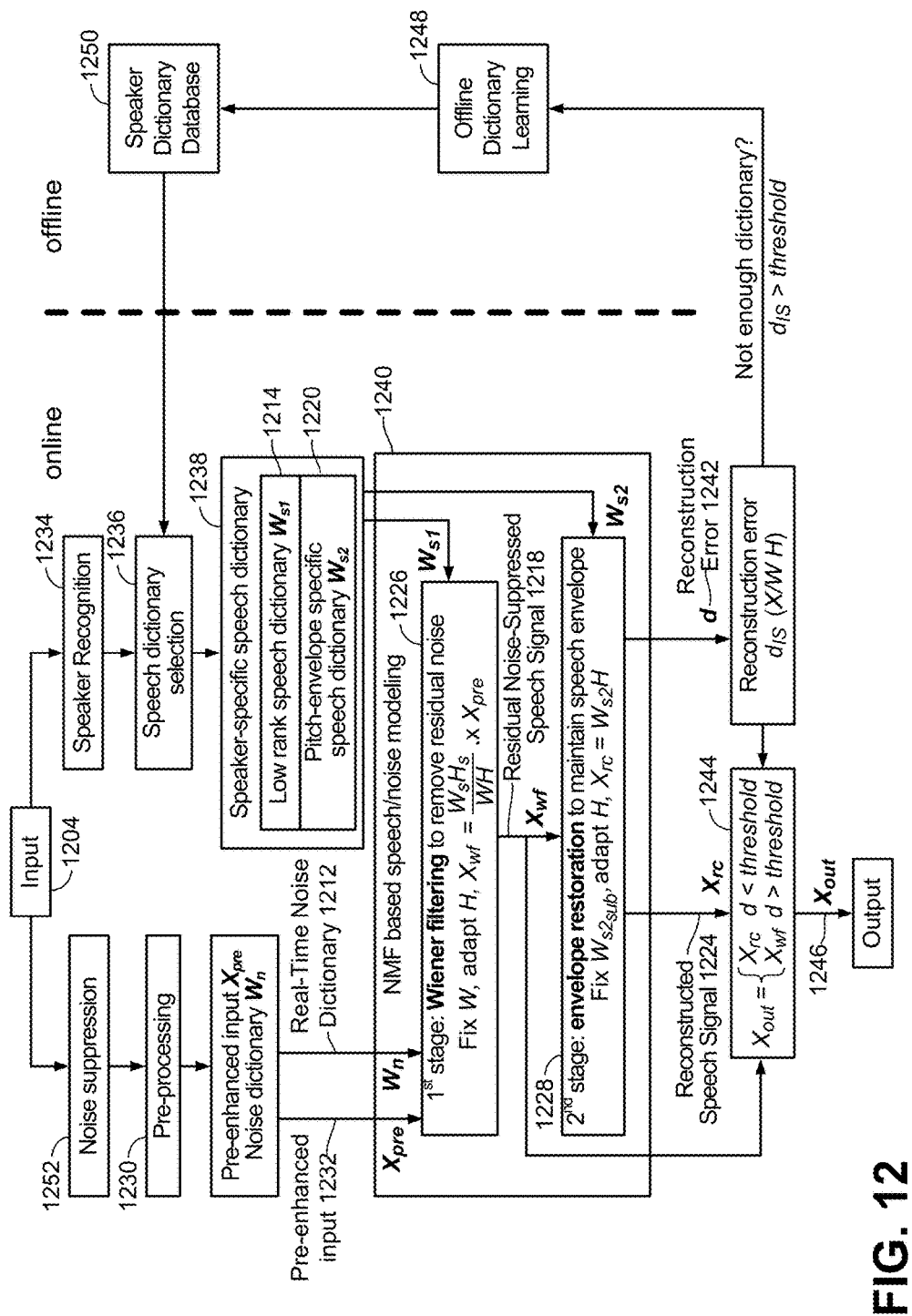
FIG. 12 is a functional block diagram illustrating a more specific configuration of the systems and methods disclosed herein.

FIG. 12 is a functional block diagram illustrating a more specific configuration of the systems and methods disclosed herein. One or more of the functions, procedures, parameters, values and/or structures described in connection with FIG. 12 may be examples of one or more of the functions, procedures, parameters, values and/or structures described in connection with one or more of FIGS. 1-5 and 10. In particular, FIG. 12 illustrates a noise suppression module 1252, a voice print module 1234, a pre-processing module 1230, a speech dictionary selection module 1236, an offline dictionary learning module 1248, an NMF based speech/noise modeling module 1240 and a signal selection module 1244.

A more detailed explanation is provided as follows. An input 1204 (e.g., a noisy speech signal) may be provided to a noise suppression module 1252 and to a voice print module 1234. The noise suppression module 1252 may perform noise suppression as described above in connection with one or more of FIGS. 3 and 10. The noise suppression output magnitude may be provided to the pre-processing module 1230.

The pre-processing module 1230 may obtain a real-time noise reference as described above in connection with one or more of FIGS. 3 and 10. The pre-processing module 1230 may generate a pre-enhanced input 1232 (e.g., $X_{pre}$) based on the primary channel of the input 1204 and the real-time noise reference. Additionally, the pre-processing module 1230 may obtain a real-time noise dictionary 1212 (e.g., $W_n$) online based on the real-time noise reference. A more specific example of noise suppression and pre-processing is described in connection with FIG. 18. The pre-enhanced input 1232 and the real-time noise dictionary 1212 may be provided to the NMF-based speech/noise modeling module 1240.

The voice print module 1234 may perform speaker recognition as described above in connection with one or more of FIGS. 3 and 10. For example, the voice print module 1234 may provide an indication of a speaker identification or an indication that the current speaker is unidentified or does not match any known profile.

Regarding the offline dictionary learning module 1248, a speaker dictionary database 1250 may be initialized with a generic speaker dictionary. The offline dictionary learning module 1248 may learn a specific speaker's speech dictionary when a condition is satisfied (e.g., when an SNR measurement of input speech is above an SNR threshold, for example).

The speech dictionary selection module 1236 may obtain a first speech dictionary 1214 (e.g., $W_{s1}$) for first modeling stage speech modeling as described above in connection with one or more of FIGS. 3 and 10. The speech dictionary selection module 1236 (e.g., speaker-specific speech dictionary selection module 1236) may also select a second speech dictionary 1220 (e.g., $W_{s2}$) for second modeling stage speech modeling as described above in connection with one or more of FIGS. 3 and 10. As illustrated in FIG. 12, the first speech dictionary 1214 and the second speech dictionary 1220 may each be subsets of a speaker-specific speech dictionary 1238 in some configurations. The first speech dictionary 1214 and the second speech dictionary 1220 may be provided to the NMF based speech/noise modeling module 1240.

The NMF based speech/noise modeling module 1240 may reduce (e.g., remove) residual noise and generate a reconstructed speech signal 1224. Reducing residual noise may be performed at a first modeling stage 1226 and generating the reconstructed speech signal 1224 may be performed at a second modeling stage 1228.

The first modeling stage 1226 may include NMF based Wiener filtering. For example, for a given trained speech/noise dictionary (e.g., W=[$W_{s1}$,$W_n$]), the NMF based speech/noise modeling module 1240 may model each frame of noisy speech spectrum as X≈WH. H=[$H_s$,$H_n$] may represent the activation weights of each dictionary (where $H_s$ are the first speech dictionary activation weights and $H_n$ are the real-time noise dictionary activation weights). The NMF based speech/noise modeling module 1240 may decompose the noisy speech X into speech and noise signals by finding H. This may be accomplished by minimizing a fit measure defined by $$d_{IS}(X|WH) = \frac{X}{WH} - \log\frac{X}{WH} - 1,$$

for example. For instance, the first modeling stage 1226 may fix W, update (e.g., adapt) H and generate a residual noise-suppressed speech signal 1218 (e.g., $X_{wf}$) using a Weiner filtering approach $$X_{wf} = \frac{W_s H_s}{WH} \cdot \times X_{pre},$$

where $\cdot\times$ is an element-wise multiplication.

In some configurations, the NMF based speech/noise modeling module 1240 may perform NMF based envelope restoration at the second modeling stage 1228 as follows. For a given second speech dictionary 1220 $W_{s2}$ (e.g., speaker-specific speech dictionary), the NMF based speech/noise modeling module 1240 may model high SNR sub-band speech spectrum as $X_{wf,sub} \approx W_{s2,sub}H$. In some configurations, the NMF based speech/noise modeling module 1240 may fix $W_{s2,sub}$, update (e.g., adapt) H and generate a reconstructed speech signal 1224 (e.g., reconstructed all band speech $X_{rc}=W_{s2}H$).

The residual noise-suppressed speech signal 1218 and the reconstructed speech signal 1224 may optionally be provided to the signal selection module 1244. The signal selection module 1244 may select one of the residual noise-suppressed speech signal 1218 and the reconstructed speech signal 1224 based on a reconstruction error 1242. For example, if the reconstruction error 1242 (e.g., $d_{IS}$(X|WH), $d_{IS}$ or d) is high (e.g., greater than a threshold), then the residual noise-suppressed speech signal 1218 (e.g., Wiener filtering output $X_{wf}$) may be selected as the output 1246 (e.g., $X_{out}$). For example, $$X_{out} = \begin{cases} X_{rc} & d_{IS} < \text{threshold} \\ X_{wf} & d_{IS} > \text{threshold} \end{cases}$$

Additionally, if the reconstruction error 1242 $d_{IS}$(X|WH) is high (e.g., greater than the same or a different threshold), the NMF based speech/noise modeling module 1240 may activate the offline dictionary learning module 1248 to further train a speech dictionary and/or to train one or more additional speech dictionaries.

The offline dictionary learning module 1248 may perform dictionary learning and/or training for the first modeling stage 1226 and/or for the second modeling stage 1228. More detailed examples of dictionary learning and/or training are provided in connection with FIGS. 13-16.

Figure 13:
FIG. 13 is a block diagram illustrating a more specific example of dictionary learning for first modeling stage speech modeling.

FIG. 13 is a block diagram illustrating a more specific example of dictionary learning for first modeling stage speech modeling. In particular, FIG. 13 illustrates one example of an NMF-based speech dictionary learning module 1382. The NMF-based speech dictionary learning module 1382 may be one example of (or a portion of) one or more of the offline dictionary learning modules 348, 1248 and first speech dictionary generation module 452 described above.

As illustrated in FIG. 13, speaker-specific clean speech magnitude spectra 1380 (e.g., V) may be provided to the NMF-based speech dictionary learning module 1382. For example, an electronic device may collect and/or receive clean speech signals (e.g., speech signals with high SNR and/or without noise). These clean speech signals may be captured "offline," such as during phone calls where SNR is high, when little or no noise is detected, during a calibration procedure, during a training procedure, etc. Additionally or alternatively, an electronic device may select certain speech signals as clean speech signals when one or more conditions are met (e.g., when captured speech exhibits an SNR that is above a threshold). Additionally or alternatively, the clean speech signals may be captured by another device and transmitted to the electronic device. It should be noted that in NMF, V may denote a matrix that is sought to be factorized, as in V=WH.

The NMF-based speech dictionary learning module 1382 may learn a first speech dictionary 1314 (e.g., a low-rank speech dictionary, a dictionary for a first modeling stage) based on NMF. For example, the NMF-based speech dictionary learning module 1382 may randomly initialize activation coefficients H and one or more speech basis functions $W_{s1}$ and update parameters (e.g., H) until convergence. In some configurations, this may be accomplished in accordance with the equation $$H \leftarrow H \cdot \frac{W_{s1}^T((W_{s1}H) \cdot [\beta - 2] \cdot V)}{W_{s1}^T(W_{s1}H) \cdot [\beta - 1]}$$

and/or in accordance with the equation $$W_{s1} \leftarrow W_{s1} \cdot \frac{((W_{s1}H) \cdot [\beta - 2] \cdot V)H^T}{(W_{s1}H) \cdot [\beta - 1]H^T},$$

where β is a parameter to control the divergence type that is minimized during the update. It should be noted that in the foregoing equations, "T" denotes a matrix transpose.

Figure 14:
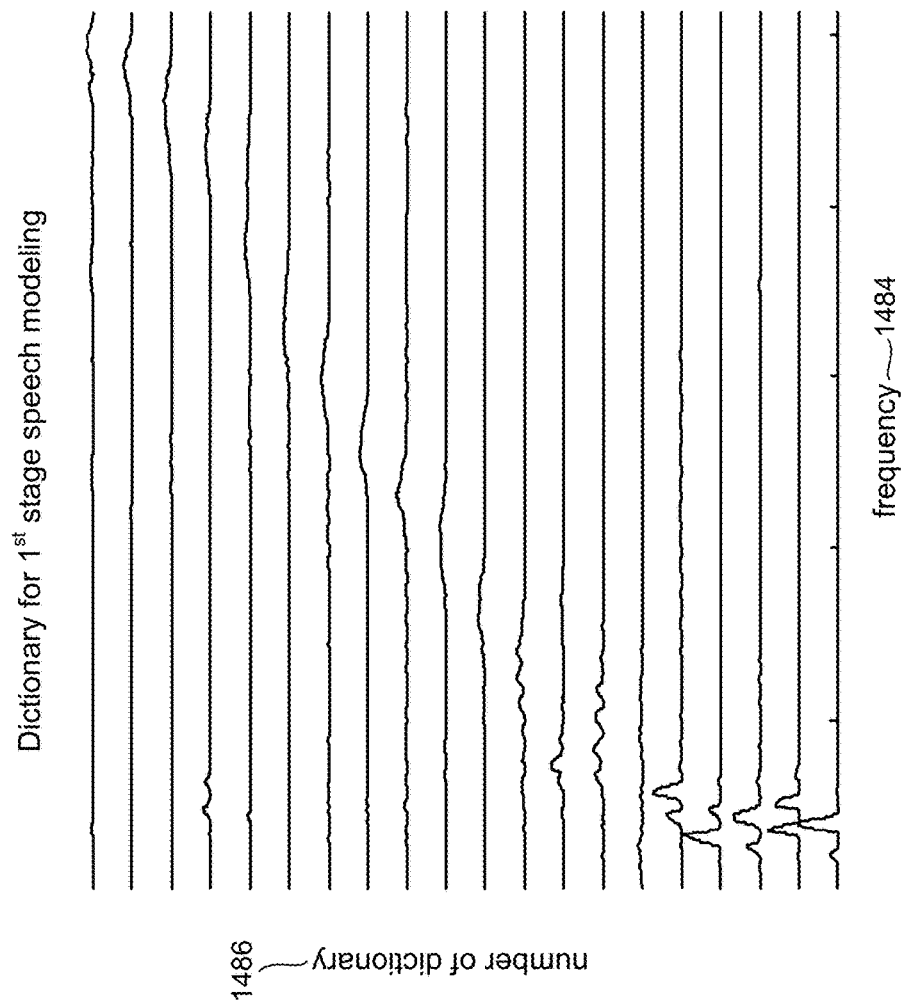
FIG. 14 is a graph illustrating one example of a dictionary for first modeling stage speech modeling.

FIG. 14 is a graph illustrating one example of a dictionary for first modeling stage speech modeling. In particular, the dictionary for first modeling stage speech modeling is illustrated in a dictionary number 1486 over frequency 1484.

Figure 15:
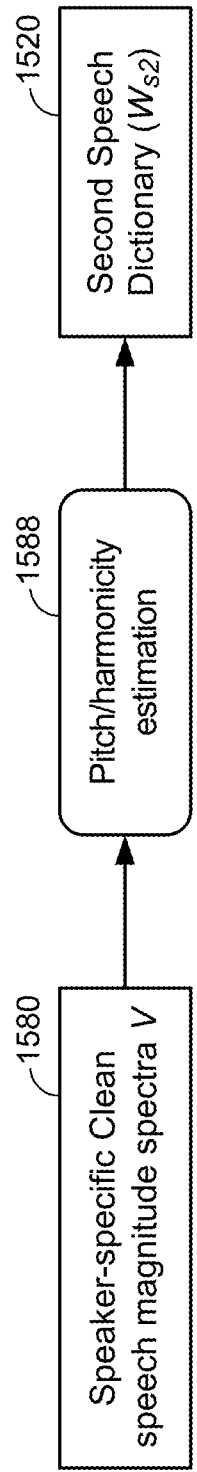
FIG. 15 is a block diagram illustrating a more specific example of dictionary learning for second modeling stage speech modeling.

FIG. 15 is a block diagram illustrating a more specific example of dictionary learning for second modeling stage speech modeling. In particular, FIG. 15 illustrates one example of a pitch/harmonicity estimation module 1588. The pitch/harmonicity estimation module 1588 may be one example of (or a portion of) one or more of the offline dictionary learning modules 348, 1248 and second speech dictionary generation module 454 described above.

As illustrated in FIG. 15, speaker-specific (clean) speech magnitude spectra 1580 (e.g., V) may be provided to the pitch/harmonicity estimation module 1588. For example, the speaker-specific clean speech magnitude spectra 1580 may be obtained as described above in connection with one or more of FIGS. 1 and 13.

The pitch/harmonicity estimation module 1588 may estimate the harmonicity and pitch of each speech spectrum. The pitch/harmonicity estimation module 1588 may select voiced speech spectra $V_h$ with high harmonicity (e.g., with corresponding harmonicities above a harmonicity threshold) as the second speech dictionary 1520 (e.g., $W_{s2}=V_h$), label each speech dictionary (e.g., selected speech spectra) with a corresponding pitch and/or enrich the current dictionary by changing the pitch of each spectrum dictionary. In some configurations, the pitch-labeled speech dictionary may be enriched as follows. Given a pitch-labeled speech dictionary, the pitch may be shifted without changing its formants or envelope in the frequency domain. In this way, given one available speech dictionary, an expanded set (e.g., the whole set) of speech dictionary elements that spans the entire pitch range corresponding to the particular formant structure and/or envelope may be obtained.

Figure 16:
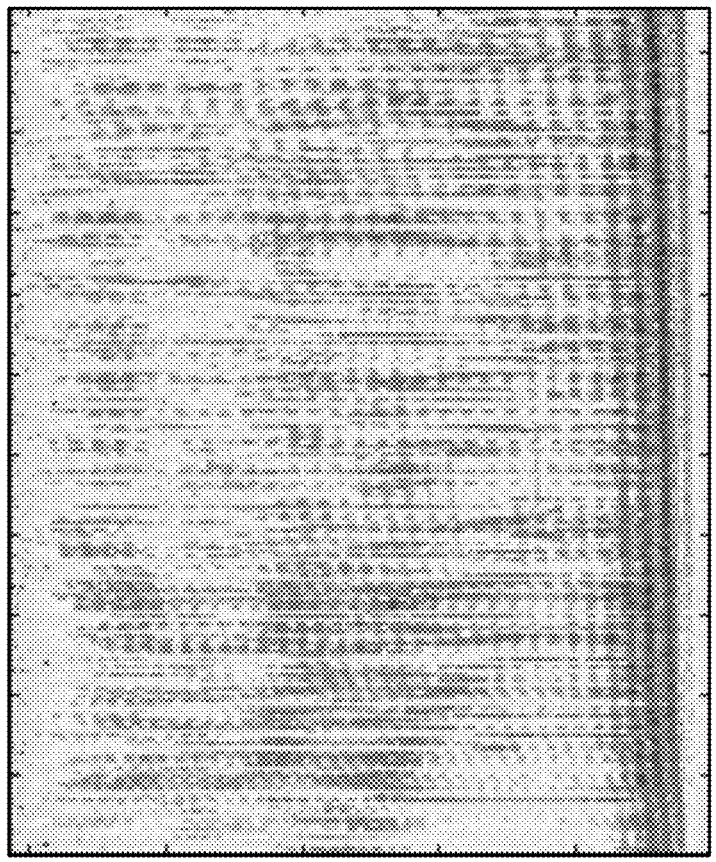
FIG. 16 is a graph illustrating one example of a dictionary for second modeling stage speech modeling.

FIG. 16 is a graph illustrating one example of a dictionary for second modeling stage speech modeling. In particular, the second speech dictionary for second modeling stage speech modeling is illustrated in frequency 1690 over a dictionary number 1692.

Figure 17:
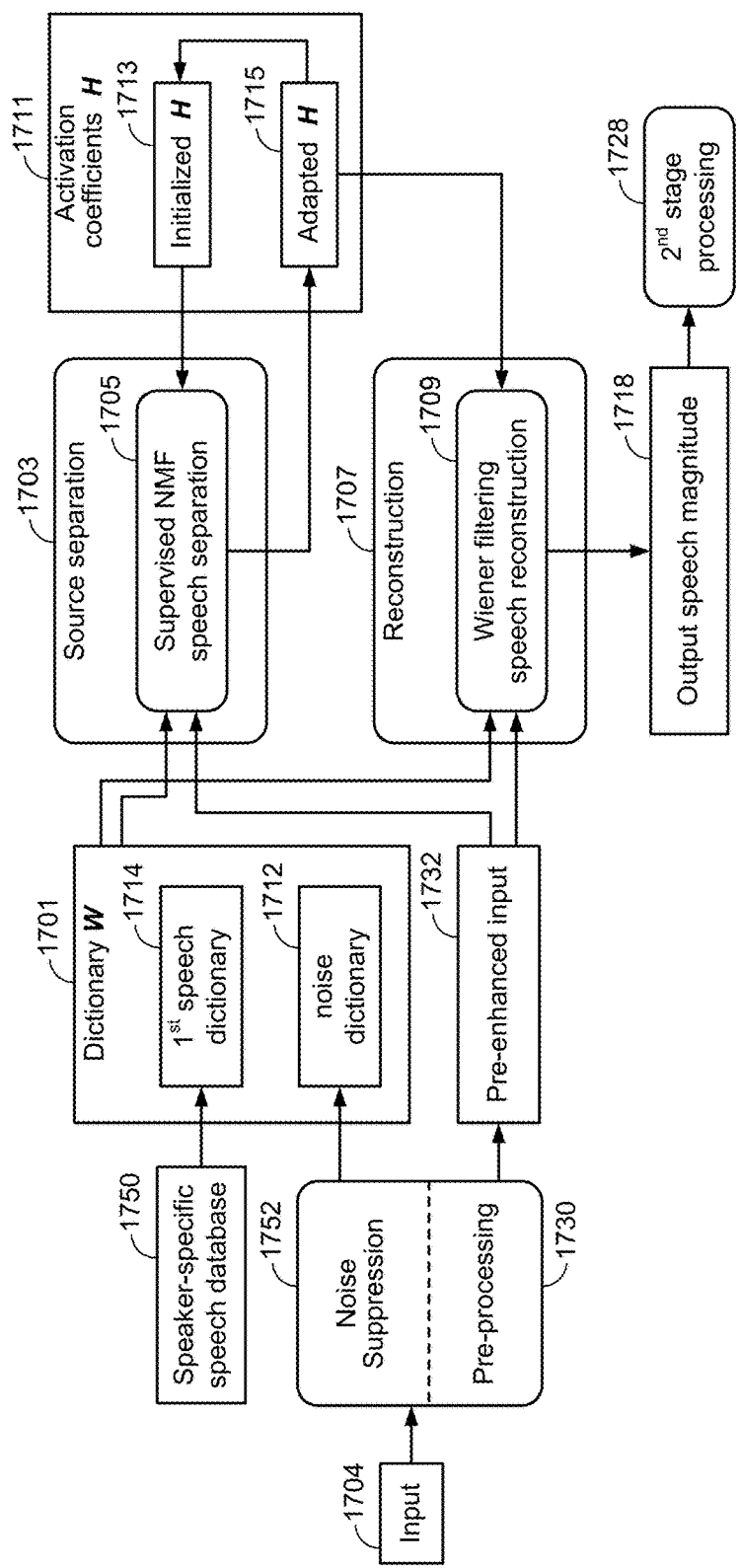
FIG. 17 is a block diagram illustrating a more specific example of an overview of first modeling stage NMF Wiener filtering.

FIG. 17 is a block diagram illustrating a more specific example of an overview of first modeling stage NMF Wiener filtering. In particular, FIG. 17 illustrates a noise suppression module 1752/pre-processing module 1730, a source separation module 1703 and a reconstruction module 1707. One or more of the functions, procedures, parameters, values and/or structures described in connection with FIG. 17 may be examples of one or more of the functions, procedures, parameters, values and/or structures described in connection with one or more of FIGS. 1-5, 10, 12 and 21.

In this example, an input 1704 (e.g., noisy speech signal) is provided to the noise suppression module 1752/pre-processing module 1730. The noise suppression module 1752/pre-processing module 1730 may produce a noise dictionary 1712 and a pre-enhanced input 1732. The pre-enhanced input 1732 may be provided to the source separation module 1703 and the reconstruction module 1707.

A first speech dictionary 1714 (for a first modeling stage, for example) may be extracted from a speaker-specific speech database 1750. A dictionary 1701 (e.g., W) may include the first speech dictionary 1714 and the noise dictionary 1712. The dictionary 1701 may be provided to the source separation module 1703 and to the reconstruction module 1707.

The source separation module 1703 may perform supervised NMF speech separation 1705 based on activation coefficients H 1711. For example, the source separation module 1703 may initialize H 1713 and adapt H 1715. Upon convergence (or when a maximum iteration limit is reached, for example), the adapted H 1715 may be provided to the reconstruction module 1707.

The reconstruction module 1707 may perform Wiener filtering speech reconstruction 1709 based on the dictionary 1701, the pre-enhanced input 1732 and the adapted coefficients 1715 to produce an output speech magnitude 1718 (e.g., a residual noise-suppressed speech signal). The output speech magnitude 1718 may be provided to a second modeling stage 1728. More detail regarding the functions, modules and/or structures of FIG. 17 is provided in FIGS. 18-20.

Figure 18:
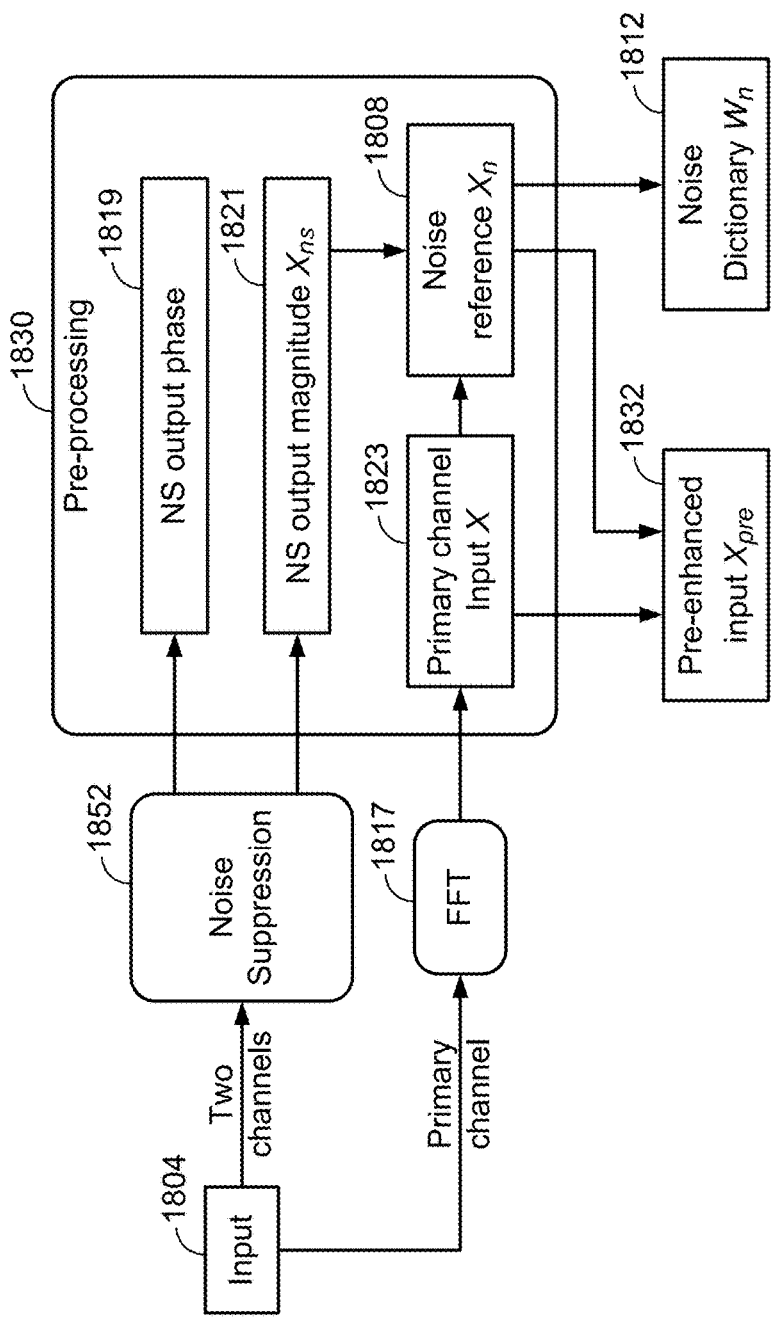
FIG. 18 is a block diagram illustrating one example of pre-processing.

FIG. 18 is a block diagram illustrating one example of pre-processing. In particular, FIG. 18 illustrates one example of a pre-processing module 1830. One or more of the functions, procedures, parameters, values and/or structures described in connection with FIG. 18 may be examples of one or more of the functions, procedures, parameters, values and/or structures described in connection with one or more of FIGS. 1-5, 10, 12, 17 and 21.

In this example, two channels of an input 1804 (e.g., noisy speech signal) are provided to the noise suppression module 1852. The noise suppression module 1852 may produce a noise suppression output phase 1819 and a noise suppression output magnitude 1821 (e.g., $X_{ns}$).

The primary channel of the input 1804 may be provided to a fast Fourier transform (FFT) module 1817. The primary channel of the input 1804 may be a channel (e.g., microphone) of the input that captures the most speech (e.g., has the highest SNR, highest speech magnitude, etc.). Additionally or alternatively, the primary channel of the input 1804 may be predetermined. The FFT module 1817 may transform the primary channel of the input 1804 into the frequency domain (e.g., into a spectral representation). The resulting primary channel input (e.g., X) 1823 may be provided to the pre-processing module 1830.

In some configurations, the pre-processing module 1830 may determine a noise reference 1808 (e.g., $X_n$). This may be accomplished in accordance with the equation $X_n$=abs (X−β$X_{ns}$), where β is a gain factor to match input X and the noise suppression output.

In some configurations, the pre-processing module 1830 may determine a pre-enhanced input signal 1832 (e.g., $X_{pre}$) in accordance with the equation $X_{pre}$=X−α$X_n$. One example of α=0.8. In some configurations, the pre-processing module 1830 may obtain the noise dictionary 1812 in accordance with the equation $$W_n = \frac{X_n}{\text{sum}(X_n)}.$$

Figure 19:
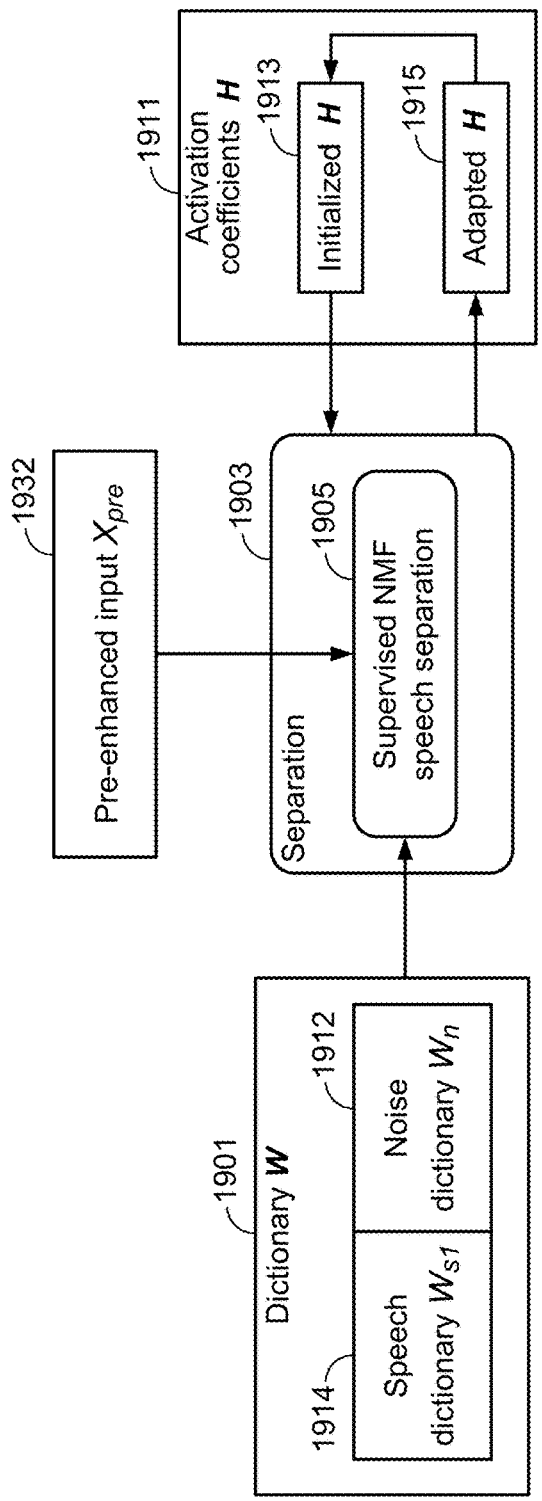
FIG. 19 is a block diagram illustrating one example of first modeling stage speech/noise separation.

FIG. 19 is a block diagram illustrating one example of first modeling stage speech/noise separation. In particular, FIG. 19 illustrates one example of a source separation module 1903. One or more of the functions, procedures, parameters, values and/or structures described in connection with FIG. 19 may be examples of one or more of the functions, procedures, parameters, values and/or structures described in connection with one or more of FIGS. 1-5, 10, 12, 17-18 and 21.

A dictionary 1901 (e.g., W) may include the first speech dictionary 1914 (e.g., $W_{s1}$) and the noise dictionary 1912 (e.g., $W_n$). The dictionary 1901 may be provided to the source separation module 1903. A pre-enhanced input 1932 (e.g., $X_{pre}$ as described in connection with FIG. 18) may also be provided to the source separation module 1903.

The source separation module 1903 may perform supervised NMF speech separation 1905 based on activation coefficients H 1911. For example, the source separation module 1903 may initialize H 1913 and adapt H 1915 until convergence (or until a maximum iteration limit is reached, for example).

In some configurations, the source separation module 1903 may operate in accordance with the equation $$H \leftarrow H \cdot \frac{W^T((WH) \cdot [\beta - 2] \cdot X_{pre})}{W^T(WH) \cdot [\beta - 1]}.$$

For example, the dictionary W 1901 is fixed, while only the activation coefficients H 1911 may be adapted. For a first frame, the activation coefficients H 1911 may be randomly initialized. For a second frame and after, the source separation module 1903 may utilize updated activation coefficients H 1911 from the previous frame to start the iteration. The source separation module 1903 may update the activation coefficients H 1911 until convergence. Convergence may be detected when the change between previous and current activation coefficients is below a threshold.

Figure 20:
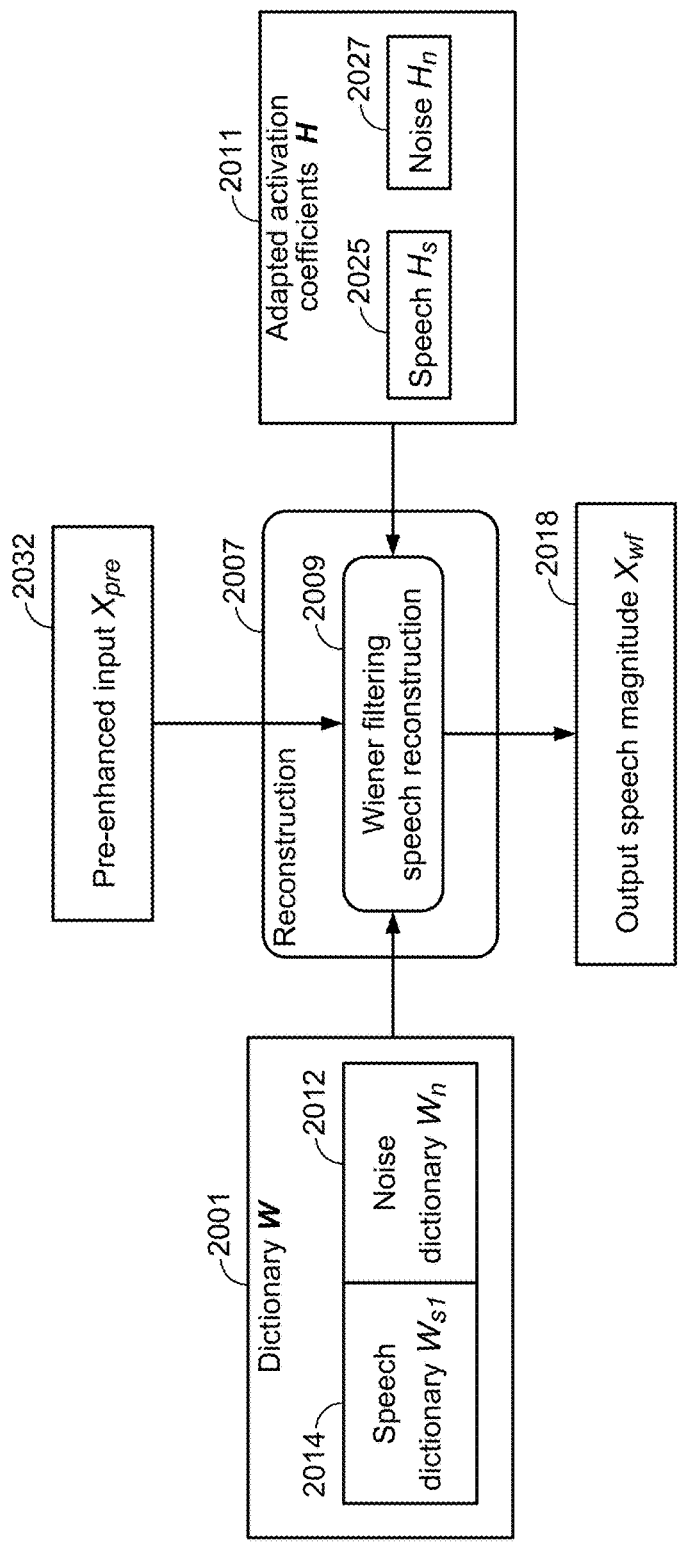
FIG. 20 is a block diagram illustrating one example of first modeling stage Wiener filtering reconstruction.

FIG. 20 is a block diagram illustrating one example of first modeling stage Wiener filtering reconstruction. In particular, FIG. 20 illustrates one example of a reconstruction module 2007. The reconstruction module 2007 may include a Wiener filtering speech reconstruction module 2009. One or more of the functions, procedures, parameters, values and/or structures described in connection with FIG. 20 may be examples of one or more of the functions, procedures, parameters, values and/or structures described in connection with one or more of FIGS. 1-5, 10, 12, 17-19 and 21.

A dictionary 2001 (e.g., W) may include the first speech dictionary 2014 (e.g., $W_{s1}$) and the noise dictionary 2012 (e.g., $W_n$). The dictionary 2001 may be provided to the reconstruction module 2007 (e.g., to the Wiener filtering speech reconstruction module 2009). Adapted activation coefficients H 2011 (including speech activation coefficients $H_s$ 2025 and noise activation coefficients $H_n$ 2027) may be provided to the reconstruction module 2007. A pre-enhanced input signal 2032 (e.g., $X_{pre}$) may also be provided to the reconstruction module 2007.

The reconstruction module 2007 may create a filter $M_s$. In some configurations, this may be accomplished in accordance with the equation $$M_s = \frac{\hat{X}_s^\alpha}{\hat{X}_s^\alpha + \hat{X}_s^\alpha} = \frac{(W_{s1}H_s)^\alpha}{(W_{s1}H_s)^\alpha + (W_nH_n)^\alpha} = \frac{\sum_{i \in s}(w_i h_i^T)^\alpha}{\sum_{i=1}^K (w_i h_i^T)^\alpha}.$$

α may be set to 1 or 2, for example. The reconstruction module 2007 (e.g., the Wiener filtering speech reconstruction module 2009) may estimate a speech magnitude $X_{wf}$ 2018 (e.g., residual noise-suppressed speech signal) in accordance with the equation $X_{wf}$=$M_s$·×$X_{pre}$ where ·× is an element-wise multiplication.

Figure 21:
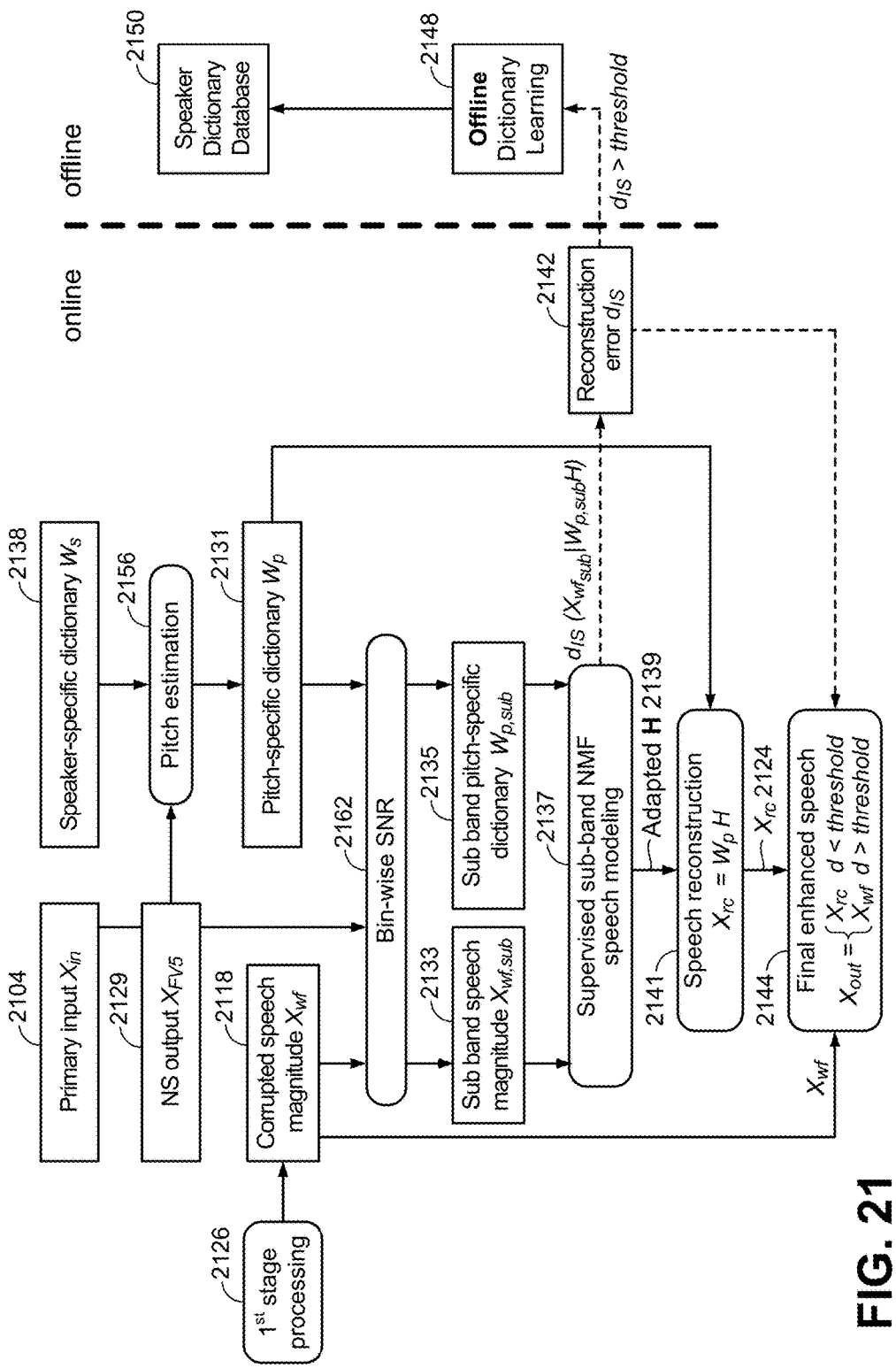
FIG. 21 is a block diagram illustrating a more specific example of second modeling stage NMF speech modeling.

FIG. 21 is a block diagram illustrating a more specific example of second modeling stage NMF speech modeling. In particular, FIG. 21 illustrates a pitch estimation module 2156, a bin-wise SNR module 2162, a supervised sub-band NMF speech modeling module 2137, a speech reconstruction module 2141, a signal selection module 2144 and an offline dictionary learning module 2148. One or more of the functions, procedures, parameters, values and/or structures described in connection with FIG. 21 may be examples of one or more of the functions, procedures, parameters, values and/or structures described in connection with one or more of FIGS. 1-5, 10, 12-13, 15 and 17.

Second modeling stage speech modeling explanations are given as follows. As illustrated in FIG. 21, an electronic device may obtain a primary input (e.g., a primary channel input) $X_{in}$ 2104. A noise suppression output $X_{ns}$ 2129 may be based on the input 2104. In some configurations, the noise suppression output $X_{ns}$ 2129 may be based on multiple channels. The noise suppression output $X_{ns}$ 2129 may be provided to the pitch estimation module 2156 and the bin-wise SNR module 2162.

In some configurations, a speech magnitude spectrum $X_{wf}$ 2118 (e.g., Wiener filtering speech magnitude spectrum, residual noise-suppressed speech signal, corrupted speech magnitude, etc.) may be provided by first stage (e.g., first modeling stage) processing 2126. An example of first stage processing 2126 is given in connection with FIG. 20. The pitch estimation module 2156 may estimate pitch and harmonicity for each Wiener filtering speech magnitude spectrum $X_{wf}$ 2118. The pitch and/or harmonicity may be estimated based on the noise suppression output $X_{NS}$ 2129 and a speaker-specific dictionary $W_s$ 2138. An electronic device (e.g., electronic device 102) may utilize the harmonicity to determine whether the corresponding frame is voiced or unvoiced. If the frame is an unvoiced frame, then the second modeling stage processing may be skipped or abandoned (e.g., processing may be stopped and/or a reconstructed speech signal 2124 for the frame may be discarded). If the frame is a voiced frame, the pitch estimation module 2156 (or another module) may find a corresponding speech dictionary (e.g., the pitch-specific dictionary $W_p$ 2131) for the given pitch.

The bin-wise SNR module 2162 may operate as follows. $X_{in}$ may be a primary channel magnitude input and $X_{NS}$ may be a noise suppression output 2129. The bin-wise SNR module 2162 may determine the bin-wise SNR (for one or more frequency bands or "bins" of the pitch-specific dictionary $W_p$ 2131), which may be defined in accordance with the equation $$SNR_k = \frac{X_{NS,k}}{X_{in,k} - X_{NS,k}}.$$

For each voiced frame, a sub-band confidence score may be defined by the equation $$\text{Confidence} = \frac{numberofbins(SNR_k > \text{threshold\_SNR})}{FFTsize}.$$

If the sub-band confidence score is less than a sub-band confidence threshold (e.g., Confidence<SubbandConfidenceThreshold), the second modeling stage processing may be skipped or abandoned for the frame (e.g., the whole frame, where Confidence is a frame-wise score). The bin-wise SNR module 2162 (and/or another module) may find a one or more reliable bands k (e.g., where $SNR_k$>threshold_SNR) and/or may generate a sub-band input magnitude spectrum 2133 in accordance with the equation $X_{wf,k}(SNR_k>\text{threshold\_SNR})=X_{wf,sub}$. The bin-wise SNR module 2162 and/or another module may generate an associated sub-band pitch specific speech dictionary 2135 in accordance with the equation $W_{p,k}(SNR_k>\text{threshold\_SNR})=W_{p,sub}$.

The supervised sub-band NMF speech modeling module 2137 may perform envelope restoration based on sub-band NMF as follows in some configurations. Sub-band NMF using sub-band speech spectrum $X_{wf,sub}$ 2133 and dictionary $W_p$ 2135 may be performed by minimizing the Itakura-Saito (IS) divergence (e.g., reconstruction error $d_{is}$ 2142), which monitors the modeling fitness. IS divergence may be defined in accordance with the equation $$d_{IS}(X_{wf,sub}|W_{p,sub}H) = \frac{X_{wf,sub}}{W_{p,sub}H} - \log\frac{X_{wf,sub}}{W_{p,sub}H} - 1.$$

The supervised sub-band NMF speech modeling module 2137 may fix dictionary $W_{p,sub}$ and update activation coefficients H 2139 until convergence in accordance with the equation $$H \leftarrow H \cdot \frac{W_{p,sub}^T((W_{p,sub}^T H) \cdot [\beta - 2] \cdot X_{wf,sub})}{W_{p,sub}^T(W_{p,sub}H) \cdot [\beta - 1]}.$$

The speech reconstruction module 2141 may perform speech reconstruction with the all band dictionary $W_p$ 2131 in accordance with the equation $X_{rc}=W_pH$. The reconstructed speech signal $X_{rc}$ 2124 may be provided to the signal selection module 2144. It should be noted that an electronic device may utilize phase from the noise suppression output when resynthesizing to a time domain signal in accordance with the equation $x_{out}=\text{ifft}(X_{out}e^{j\varphi NS})$.

Output quality may be controlled in accordance with the reconstruction error $d_{IS}(X_{wf,sub}|W_{p,sub}H)$. For example, if $d_{IS}$>threshold, the offline dictionary learning module 2148 may be activated (to update the speaker dictionary database 2150, for example).

The signal selection module 2144 may select a signal based on the reconstruction error 2142. For example, if $d_{IS}$<threshold, then $X_{wf}$ may be selected as $X_{out}$. If $d_{IS}$>threshold, then $X_{rc}$ may be selected as $X_{out}$. For instance, the reconstructed speech signal $X_{rc}$ 2124 may be combined with the Wiener filtering speech output $X_{wf}$ 2118 to get a final output as provided in the equation $$X_{out} = \begin{cases} X_{rc} & d_{IS} < \text{threshold} \\ X_{wf} & d_{IS} > \text{threshold} \end{cases}$$

In some configurations, it should be noted that when second modeling stage processing is skipped or abandoned, the output of the first stage processing (e.g., output speech magnitude, Wiener filtering speech output $X_{wf}$ 2118, etc.), a noise suppressed signal (e.g., an output of the noise suppression module 1252, NS output 2129, etc.) or an input signal (e.g., primary input 2104) may be output.

Figure 22:
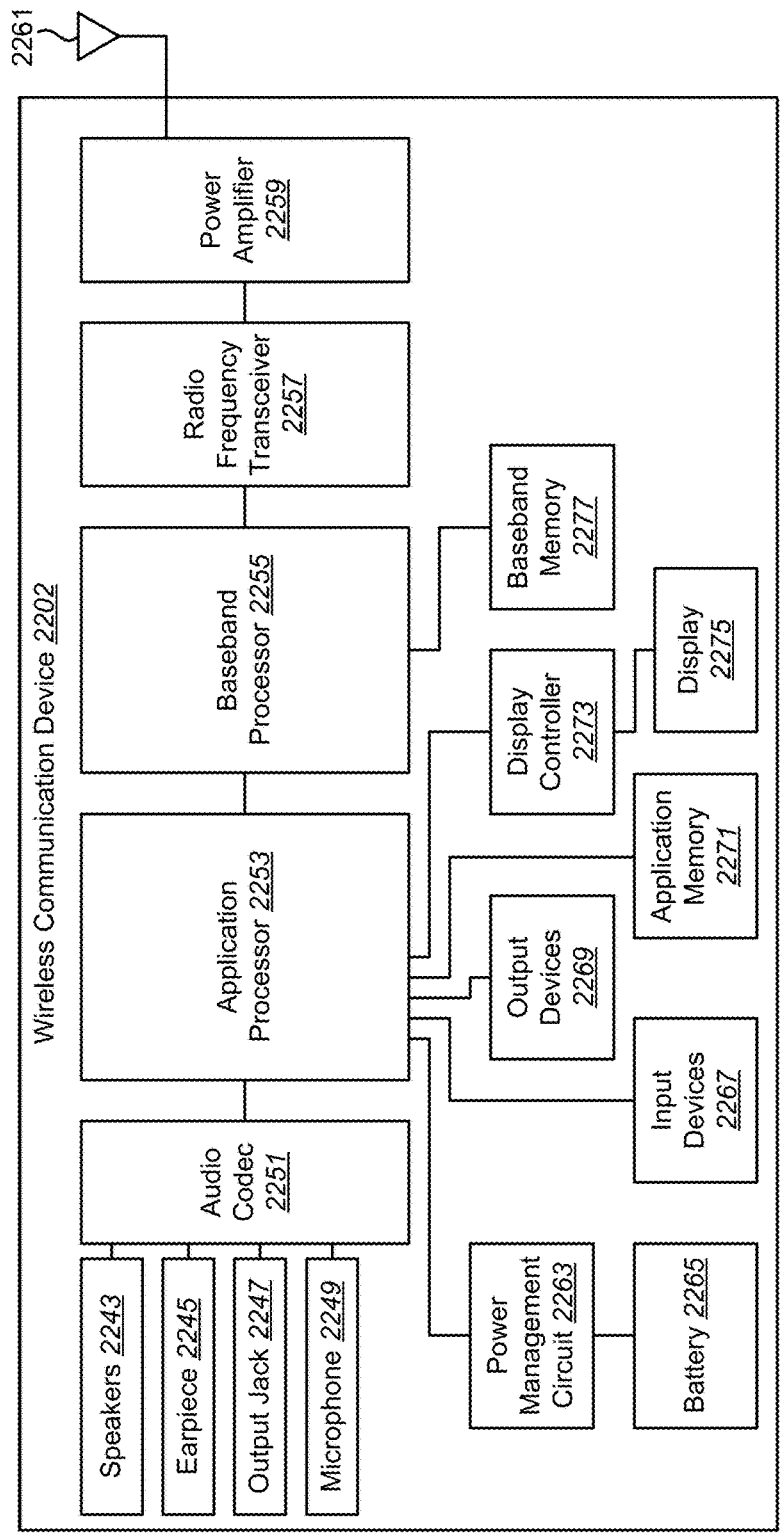
FIG. 22 is a block diagram illustrating one configuration of a wireless communication device in which systems and methods for speaker dictionary based modeling may be implemented.

FIG. 22 is a block diagram illustrating one configuration of a wireless communication device 2202 in which systems and methods for speaker dictionary based modeling may be implemented. The wireless communication device 2202 illustrated in FIG. 22 may be an example of one or more of the electronic devices described herein. The wireless communication device 2202 may include an application processor 2253. The application processor 2253 generally processes instructions (e.g., runs programs) to perform functions on the wireless communication device 2202. The application processor 2253 may be coupled to an audio coder/decoder (codec) 2251.

The audio codec 2251 may be used for coding and/or decoding audio signals. The audio codec 2251 may be coupled to at least one speaker 2243, an earpiece 2245, an output jack 2247 and/or at least one microphone 2249. The speakers 2243 may include one or more electro-acoustic transducers that convert electrical or electronic signals into acoustic signals. For example, the speakers 2243 may be used to play music or output a speakerphone conversation, etc. The earpiece 2245 may be another speaker or electro-acoustic transducer that can be used to output acoustic signals (e.g., speech signals) to a user. For example, the earpiece 2245 may be used such that only a user may reliably hear the acoustic signal. The output jack 2247 may be used for coupling other devices to the wireless communication device 2202 for outputting audio, such as headphones. The speakers 2243, earpiece 2245 and/or output jack 2247 may generally be used for outputting an audio signal from the audio codec 2251. The at least one microphone 2249 may be an acousto-electric transducer that converts an acoustic signal (such as a user's voice) into electrical or electronic signals that are provided to the audio codec 2251. In some configurations, the audio codec 2251 and/or the application processor 2253 may be configured to perform one or more of the first modeling stage processing and the second modeling stage processing (and/or one or more of the other functions or procedures) described herein.

The application processor 2253 may also be coupled to a power management circuit 2263. One example of a power management circuit 2263 is a power management integrated circuit (PMIC), which may be used to manage the electrical power consumption of the wireless communication device 2202. The power management circuit 2263 may be coupled to a battery 2265. The battery 2265 may generally provide electrical power to the wireless communication device 2202. For example, the battery 2265 and/or the power management circuit 2263 may be coupled to at least one of the elements included in the wireless communication device 2202.

The application processor 2253 may be coupled to at least one input device 2267 for receiving input. Examples of input devices 2267 include infrared sensors, image sensors, accelerometers, touch sensors, keypads, etc. The input devices 2267 may allow user interaction with the wireless communication device 2202. The application processor 2253 may also be coupled to one or more output devices 2269. Examples of output devices 2269 include printers, projectors, screens, haptic devices, etc. The output devices 2269 may allow the wireless communication device 2202 to produce output that may be experienced by a user.

The application processor 2253 may be coupled to application memory 2271. The application memory 2271 may be any electronic device that is capable of storing electronic information. Examples of application memory 2271 include double data rate synchronous dynamic random access memory (DDRAM), synchronous dynamic random access memory (SDRAM), flash memory, etc. The application memory 2271 may provide storage for the application processor 2253. For instance, the application memory 2271 may store data and/or instructions for the functioning of programs that are run on the application processor 2253.

The application processor 2253 may be coupled to a display controller 2273, which in turn may be coupled to a display 2275. The display controller 2273 may be a hardware block that is used to generate images on the display 2275. For example, the display controller 2273 may translate instructions and/or data from the application processor 2253 into images that can be presented on the display 2275. Examples of the display 2275 include liquid crystal display (LCD) panels, light emitting diode (LED) panels, cathode ray tube (CRT) displays, plasma displays, etc.

The application processor 2253 may be coupled to a baseband processor 2255. The baseband processor 2255 generally processes communication signals. For example, the baseband processor 2255 may demodulate and/or decode received signals. Additionally or alternatively, the baseband processor 2255 may encode and/or modulate signals in preparation for transmission.

The baseband processor 2255 may be coupled to baseband memory 2277. The baseband memory 2277 may be any electronic device capable of storing electronic information, such as SDRAM, DDRAM, flash memory, etc. The baseband processor 2255 may read information (e.g., instructions and/or data) from and/or write information to the baseband memory 2277. Additionally or alternatively, the baseband processor 2255 may use instructions and/or data stored in the baseband memory 2277 to perform communication operations.

The baseband processor 2255 may be coupled to a radio frequency (RF) transceiver 2257. The RF transceiver 2257 may be coupled to a power amplifier 2259 and one or more antennas 2261. The RF transceiver 2257 may transmit and/or receive radio frequency signals. For example, the RF transceiver 2257 may transmit an RF signal using a power amplifier 2259 and at least one antenna 2261. The RF transceiver 2257 may also receive RF signals using the one or more antennas 2261.

Figure 23:
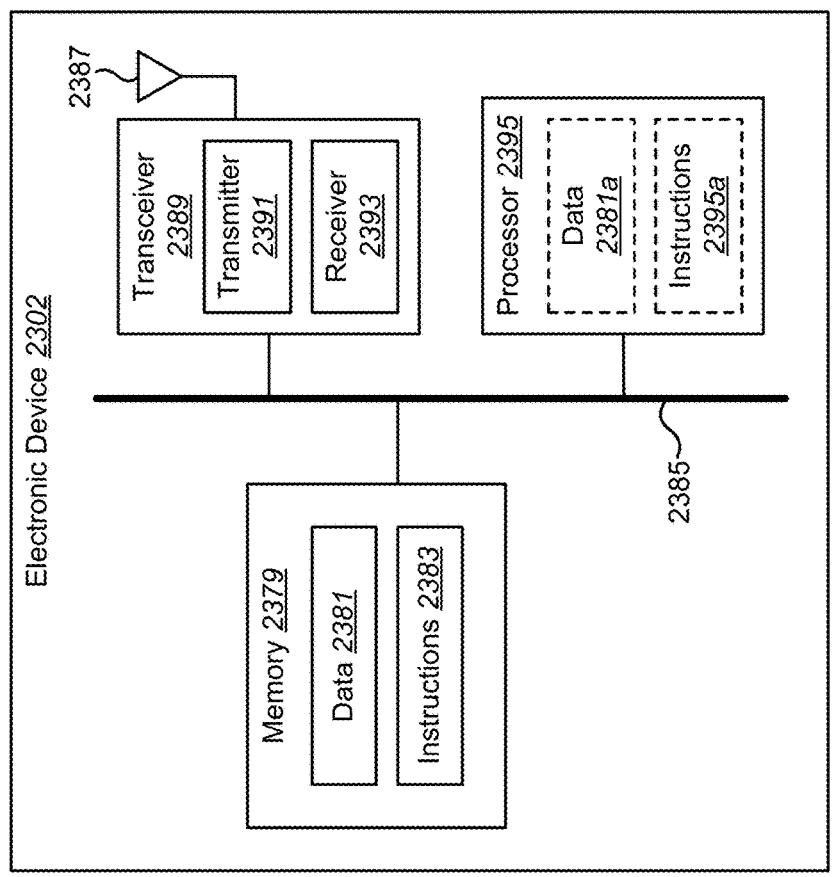
FIG. 23 illustrates certain components that may be included within an electronic device.

FIG. 23 illustrates certain components that may be included within an electronic device 2302. The electronic device 2302 described in connection with FIG. 23 may be an example of and/or may be implemented in accordance with one or more of the electronic devices 102, 402 and wireless communication device 2202 described herein.

The electronic device 2302 includes a processor 2395. The processor 2395 may be a general purpose single- or multi-chip microprocessor (e.g., an ARM), a special purpose microprocessor (e.g., a digital signal processor (DSP)), a microcontroller, a programmable gate array, etc. The processor 2395 may be referred to as a central processing unit (CPU). Although just a single processor 2395 is shown in the electronic device 2302 of FIG. 23, in an alternative configuration, a combination of processors (e.g., an ARM and DSP) could be used.

The electronic device 2302 also includes memory 2379 in electronic communication with the processor 2395 (i.e., the processor 2395 can read information from and/or write information to the memory 2379). The memory 2379 may be any electronic component capable of storing electronic information. The memory 2379 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 2381 and instructions 2383 may be stored in the memory 2379. The instructions 2383 may include one or more programs, routines, sub-routines, functions, procedures, code, etc. The instructions 2383 may include a single computer-readable statement or many computer-readable statements. The instructions 2383 may be executable by the processor 2395 to implement one or more of the methods 200, 500 described above. Executing the instructions 2383 may involve the use of the data 2381 that is stored in the memory 2379. FIG. 23 shows some instructions 2383a and data 2381a being loaded into the processor 2395.

The electronic device 2302 may also include a transmitter 2391 and a receiver 2393 to allow transmission and reception of signals between the electronic device 2302 and a remote location (e.g., a base station). The transmitter 2391 and receiver 2393 may be collectively referred to as a transceiver 2389. An antenna 2387 may be electrically coupled to the transceiver 2389. The electronic device 2302 may also include (not shown) multiple transmitters, multiple receivers, multiple transceivers and/or multiple antenna.

The various components of the electronic device 2302 may be coupled together by one or more buses, which may include a power bus, a control signal bus, a status signal bus, a data bus, etc. For simplicity, the various buses are illustrated in FIG. 23 as a bus system 2385.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It should be noted that one or more of the features, functions, procedures, parameters, values, components, elements, structures, etc., described in connection with any one of the configurations described herein may be combined with one or more of the functions, procedures, parameters, values, components, elements, structures, etc., described in connection with any of the other configurations described herein, where compatible. In other words, any compatible combination of the functions, procedures, parameters, values, components, elements, etc., described herein may be implemented in accordance with the systems and methods disclosed herein.

The functions described herein may be stored as one or more instructions on a processor-readable or computer-readable medium. The term "computer-readable medium" refers to any available medium that can be accessed by a computer or processor. By way of example, and not limitation, such a medium may comprise Random-Access Memory (RAM), Read-Only Memory (ROM), Electrically Erasable Programmable Read-Only Memory (EEPROM), flash memory, Compact Disc Read-Only Memory (CD-ROM) or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc, where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for speech modeling by an electronic device, comprising:
    obtaining, from a noisy speech signal, a real-time noise reference signal that represents a noise contribution to the noisy speech signal;
    obtaining a real-time noise dictionary based on the real-time noise reference signal;
    obtaining a first speech dictionary that is lower in rank than a second speech dictionary;
    reducing residual noise, using a pre-enhanced input signal that is derived from the noisy speech signal as input, to produce a residual noise-suppressed speech signal at a first modeling stage, wherein the reducing is based on the real-time noise dictionary and the first speech dictionary;
    generating a reconstructed speech signal, wherein the generating comprises using the residual noise-suppressed speech signal and the second speech dictionary as input to a second modeling stage that generates the reconstructed speech signal; and
    selecting an output speech signal from the reconstructed speech signal and the residual noise-suppressed speech signal based on a reconstruction error.

2. The method of claim 1, wherein the first modeling stage is based on non-negative matrix factorization (NMF).

3. The method of claim 1, wherein the second modeling stage is based on non-negative matrix factorization (NMF).

4. The method of claim 1, wherein reducing residual noise comprises:
    fixing a speech and noise dictionary that comprises the first speech dictionary and the real-time noise dictionary;
    initializing activation coefficients; and
    updating the activation coefficients until convergence.

5. The method of claim 1, wherein reducing the residual noise comprises:
    creating a filter based on the first speech dictionary, the real-time noise dictionary, an adapted speech activation coefficient and an adapted noise activation coefficient; and
    estimating the residual noise-suppressed speech signal based on the filter and the pre-enhanced input signal.

6. The method of claim 1, wherein generating the reconstructed speech signal further comprises:
    fixing a sub-band pitch-specific dictionary;
    updating activation coefficients until convergence; and
    generating the reconstructed speech signal based on a pitch-specific dictionary and the activation coefficients.

7. The method of claim 6, further comprising:
    determining the pitch-specific dictionary from a speaker-specific dictionary based on a pitch; and determining the sub-band pitch-specific dictionary from the pitch-specific dictionary based on bin-wise signal-to-noise ratios (SNRs).

8. The method of claim 1, wherein the first speech dictionary and the second speech dictionary are based on a speaker-specific speech dictionary.

9. The method of claim 1, wherein obtaining the first speech dictionary comprises:
   initializing a plurality of activation coefficients and speech basis functions; and
   updating parameters until convergence.

10. The method of claim 1, wherein obtaining the second speech dictionary comprises:
    estimating a harmonicity and a pitch for a plurality of speaker-specific speech magnitude spectra;
    selecting, from the speaker-specific speech magnitude spectra, speech spectra with corresponding harmonicities above a harmonicity threshold; and
    labeling each of the selected speech spectra with a corresponding pitch.

11. An electronic device for speech modeling, comprising:
    a processor;
    memory in electronic communication with the processor;
    instructions stored in the memory, the instructions being executable to:
      obtain, from a noisy speech signal, a real-time noise reference signal that represents noise contribution to the noisy speech signal;
      obtain a real-time noise dictionary based on the real-time noise reference signal;
      obtain a first speech dictionary that is lower in rank than a second speech dictionary;
      reduce residual noise, using a pre-enhanced input signal that is derived from the noisy speech signal as input, to produce a residual noise-suppressed speech signal at a first modeling stage, wherein the reducing is based on the real-time noise dictionary and the first speech dictionary;
      generate a reconstructed speech signal, wherein the generating comprises using the residual noise-suppressed speech signal and the second speech dictionary as input to a second modeling stage that generates the reconstructed speech signal; and
      select an output speech signal from the reconstructed speech signal and the residual noise-suppressed speech signal based on a reconstruction error.

12. The electronic device of claim 11, wherein the first modeling stage is based on non-negative matrix factorization (NMF).

13. The electronic device of claim 11, wherein the second modeling stage is based on non-negative matrix factorization (NMF).

14. The electronic device of claim 11, wherein reducing residual noise comprises:
    fixing a speech and noise dictionary that comprises the first speech dictionary and the real-time noise dictionary;
    initializing activation coefficients; and
    updating the activation coefficients until convergence.

15. The electronic device of claim 11, wherein reducing the residual noise comprises:
    creating a filter based on the first speech dictionary, the real-time noise dictionary, an adapted speech activation coefficient and an adapted noise activation coefficient; and
    estimating the residual noise-suppressed speech signal based on the filter and the pre-enhanced input signal.

16. The electronic device of claim 11, wherein generating the reconstructed speech signal further comprises:
    fixing a sub-band pitch-specific dictionary;
    updating activation coefficients until convergence; and
    generating the reconstructed speech signal based on a pitch-specific dictionary and the activation coefficients.

17. The electronic device of claim 16, wherein the instructions are further executable to:
    determine the pitch-specific dictionary from a speaker-specific dictionary based on a pitch; and
    determine the sub-band pitch-specific dictionary from the pitch-specific dictionary based on bin-wise signal-to-noise ratios (SNRs).

18. The electronic device of claim 11, wherein the first speech dictionary and the second speech dictionary are based on a speaker-specific speech dictionary.

19. The electronic device of claim 11, wherein obtaining the first speech dictionary comprises:
    initializing a plurality of activation coefficients and speech basis functions; and
    updating parameters until convergence.

20. The electronic device of claim 11, wherein obtaining the second speech dictionary comprises:
    estimating a harmonicity and a pitch for a plurality of speaker-specific speech magnitude spectra;
    selecting, from the speaker-specific speech magnitude spectra, speech spectra with corresponding harmonicities above a harmonicity threshold; and
    labeling each of the selected speech spectra with a corresponding pitch.

21. A computer-program product for speech modeling, comprising a non-transitory tangible computer-readable medium having instructions thereon, the instructions comprising:
    code for causing an electronic device to obtain, from a noisy speech signal, a real-time noise reference signal that represents noise contribution to the noisy speech signal;
    code for causing the electronic device to obtain a real-time noise dictionary based on the real-time noise reference signal;
    code for causing the electronic device to obtain a first speech dictionary that is lower in rank than a second speech dictionary;
    code for causing the electronic device to reduce residual noise, using a pre-enhanced input signal that is derived from the noisy speech signal as input, to produce a residual noise-suppressed speech signal at a first modeling stage, wherein the residual noise is reduced based on the real-time noise dictionary and the first speech dictionary;
    code for causing the electronic device to generate a reconstructed speech signal, wherein the code for causing the electronic device to generate comprises code for causing the electronic device to use the residual noise-suppressed speech signal and the second speech dictionary as input to a second modeling stage that generates the reconstructed speech signal; and
    code for causing the electronic device to select an output speech signal from the reconstructed speech signal and the residual noise-suppressed speech signal based on a reconstruction error.

22. The computer-program product of claim 21, wherein generating the reconstructed speech signal comprises:
    fixing a sub-band pitch-specific dictionary;
    updating activation coefficients until convergence; and generating the reconstructed speech signal based on a pitch-specific dictionary and the activation coefficients.

23. The computer-program product of claim 21, wherein obtaining the first speech dictionary comprises:
   initializing a plurality of activation coefficients and speech basis functions; and
   updating parameters until convergence.

24. The computer-program product of claim 21, wherein obtaining the second speech dictionary comprises:
   estimating a harmonicity and a pitch for a plurality of speaker-specific speech magnitude spectra;
   selecting, from the speaker-specific speech magnitude spectra, speech spectra with corresponding harmonicities above a harmonicity threshold; and
   labeling each of the selected speech spectra with a corresponding pitch.

25. An apparatus for speech modeling, comprising:
   means for obtaining, from a noisy speech signal, a real-time noise reference signal that represents noise contribution to the noisy speech signal;
   means for obtaining a real-time noise dictionary based on the real-time noise reference signal;
   means for obtaining a first speech dictionary that is lower in rank than a second speech dictionary;
   means for reducing residual noise, using a pre-enhanced input signal that is derived from the noisy speech signal as input, to produce a residual noise-suppressed speech signal at a first modeling stage, wherein the residual noise is reduced based on the real-time noise dictionary and the first speech dictionary;
   means for generating a reconstructed speech signal, wherein the means for generating comprises means for using the residual noise-suppressed speech signal and the second speech dictionary as input to a second modeling stage that generates the reconstructed speech signal; and
   means for selecting an output speech signal from the reconstructed speech signal and the residual noise-suppressed speech signal based on a reconstruction error.

26. The apparatus of claim 25, wherein the means for generating the reconstructed speech signal comprises:
   means for fixing a sub-band pitch-specific dictionary;
   means for updating activation coefficients until convergence; and
   means for generating the reconstructed speech signal based on a pitch-specific dictionary and the activation coefficients.

27. The apparatus of claim 25, wherein the means for obtaining the first speech dictionary comprises:
   means for initializing a plurality of activation coefficients and speech basis functions; and
   means for updating parameters until convergence.

28. The apparatus of claim 25, wherein the means for obtaining the second speech dictionary comprises:
   means for estimating a harmonicity and a pitch for a plurality of speaker-specific speech magnitude spectra;
   means for selecting, from the speaker-specific speech magnitude spectra, speech spectra with corresponding harmonicities above a harmonicity threshold; and
   means for labeling each of the selected speech spectra with a corresponding pitch.

* * * * *